United States Patent
King et al.

(10) Patent No.: US 7,656,393 B2
(45) Date of Patent: Feb. 2, 2010

(54) ELECTRONIC DEVICE HAVING DISPLAY AND SURROUNDING TOUCH SENSITIVE BEZEL FOR USER INTERFACE AND CONTROL

(75) Inventors: Nick King, San Jose, CA (US); Duncan Kerr, San Francisco, CA (US); Paul Herbst, Morgan Hill, CA (US); Steven P Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 588 days.

(21) Appl. No.: 11/426,078

(22) Filed: Jun. 23, 2006

(65) Prior Publication Data

US 2006/0238517 A1   Oct. 26, 2006

Related U.S. Application Data

(63) Continuation-in-part of application No. 11/367,749, filed on Mar. 3, 2006.

(60) Provisional application No. 60/663,345, filed on Mar. 16, 2005, provisional application No. 60/658,777, filed on Mar. 4, 2005.

(51) Int. Cl.
*G06F 3/041*  (2006.01)
*G09G 5/00*  (2006.01)
*G06F 3/02*  (2006.01)
*G06F 3/045*  (2006.01)
*H04B 1/40*  (2006.01)
*A61M 37/00*  (2006.01)

(52) U.S. Cl. ............. 345/173; 345/156; 345/169; 345/174; 455/77; 604/6.13

(58) Field of Classification Search .......... 345/156–178
See application file for complete search history.

(56) References Cited

U.S. PATENT DOCUMENTS

3,333,160 A   7/1967   Gorski (Continued)

FOREIGN PATENT DOCUMENTS

CA   1243096   10/1988

(Continued)

OTHER PUBLICATIONS

Quantum Research Group, "QT510 / QWheel(TM) Touch Slider IC," copyright 2004-2005, 14-pgs.

(Continued)

*Primary Examiner*—Sumati Lefkowitz
*Assistant Examiner*—Charles Hicks
(74) *Attorney, Agent, or Firm*—Morrison & Foerster LLP

(57) ABSTRACT

An electronic device has a display and has a touch sensitive bezel surrounding the display. Areas on the bezel are designated for controls used to operate the electronic device. Visual guides corresponding to the controls are displayed on the display adjacent the areas of the bezel designated for the controls. Touch data is generated by the bezel when a user touches an area of the bezel. The device determines which of the controls has been selected based on which designated area is associated with the touch data from the bezel. The device then initiates the determined control. The device can have a sensor for determining the orientation of the device. Based on the orientation, the device can alter the areas designated on the bezel for the controls and can alter the location of the visual guides for the display so that they match the altered areas on the bezel.

45 Claims, 13 Drawing Sheets

U.S. PATENT DOCUMENTS

| | | | |
|---|---|---|---|
| 3,541,541 A | 11/1970 | Englebart | |
| 3,662,105 A | 5/1972 | Hurst et al. | |
| 3,798,370 A | 3/1974 | Hurst | |
| 4,246,452 A | 1/1981 | Chandler | |
| 4,550,221 A | 10/1985 | Mabusth | |
| 4,566,001 A | 1/1986 | Moore et al. | |
| 4,672,364 A | 6/1987 | Lucas | |
| 4,672,558 A | 6/1987 | Beckes et al. | |
| 4,692,809 A | 9/1987 | Beining et al. | |
| 4,695,827 A | 9/1987 | Beining et al. | |
| 4,733,222 A | 3/1988 | Evans | |
| 4,734,685 A | 3/1988 | Watanabe | |
| 4,746,770 A | 5/1988 | McAvinney | |
| 4,771,276 A | 9/1988 | Parks | |
| 4,788,384 A | 11/1988 | Bruere-Dawson et al. | |
| 4,806,846 A | 2/1989 | Kerber | |
| 4,896,370 A * | 1/1990 | Kasparian et al. | 455/77 |
| 4,898,555 A | 2/1990 | Sampson | |
| 4,933,660 A | 6/1990 | Wynne, Jr. | |
| 4,968,877 A | 11/1990 | McAvinney et al. | |
| 5,003,519 A | 3/1991 | Noijean | |
| 5,017,030 A | 5/1991 | Crews | |
| 5,178,477 A | 1/1993 | Gambaro | |
| 5,189,403 A | 2/1993 | Franz et al. | |
| 5,194,862 A | 3/1993 | Edwards | |
| 5,224,861 A | 7/1993 | Glass et al. | |
| 5,241,308 A | 8/1993 | Young | |
| 5,252,951 A | 10/1993 | Tannenbaum et al. | |
| 5,281,966 A | 1/1994 | Walsh | |
| 5,305,017 A | 4/1994 | Gerpheide | |
| 5,345,543 A | 9/1994 | Capps et al. | |
| 5,376,948 A | 12/1994 | Roberts | |
| 5,379,057 A | 1/1995 | Clough et al. | |
| 5,398,310 A | 3/1995 | Tchao et al. | |
| 5,442,742 A | 8/1995 | Greyson et al. | |
| 5,463,388 A | 10/1995 | Boie et al. | |
| 5,463,696 A | 10/1995 | Beernink et al. | |
| 5,483,261 A | 1/1996 | Yasutake | |
| 5,488,204 A | 1/1996 | Mead et al. | |
| 5,495,077 A | 2/1996 | Miller et al. | |
| 5,513,309 A | 4/1996 | Meier et al. | |
| 5,523,775 A | 6/1996 | Capps | |
| 5,530,455 A | 6/1996 | Gillick et al. | |
| 5,543,590 A | 8/1996 | Gillespie et al. | |
| 5,543,591 A | 8/1996 | Gillespie et al. | |
| 5,563,632 A | 10/1996 | Roberts | |
| 5,563,996 A | 10/1996 | Tchao | |
| 5,565,658 A | 10/1996 | Gerpheide et al. | |
| 5,579,036 A | 11/1996 | Yates, IV | |
| 5,581,681 A | 12/1996 | Tchao et al. | |
| 5,583,946 A | 12/1996 | Gourdol | |
| 5,590,219 A | 12/1996 | Gourdol | |
| 5,592,566 A | 1/1997 | Pagallo et al. | |
| 5,594,471 A | 1/1997 | Deeran et al. | |
| 5,594,810 A | 1/1997 | Gourdol | |
| 5,596,694 A | 1/1997 | Capps | |
| 5,612,719 A | 3/1997 | Beernink et al. | |
| 5,631,805 A | 5/1997 | Bonsall | |
| 5,633,955 A | 5/1997 | Bozinovic et al. | |
| 5,634,102 A | 5/1997 | Capps | |
| 5,636,101 A | 6/1997 | Bonsall et al. | |
| 5,642,108 A | 6/1997 | Gopher et al. | |
| 5,644,657 A | 7/1997 | Capps et al. | |
| 5,666,113 A | 9/1997 | Logan | |
| 5,666,502 A | 9/1997 | Capps | |
| 5,666,552 A | 9/1997 | Greyson et al. | |
| 5,675,361 A | 10/1997 | Santilli | |
| 5,675,362 A | 10/1997 | Clough et al. | |
| 5,677,710 A | 10/1997 | Thompson-Rohrlich | |
| 5,689,253 A | 11/1997 | Hargreaves et al. | |
| 5,710,844 A | 1/1998 | Capps et al. | |
| 5,729,250 A | 3/1998 | Bishop et al. | |
| 5,730,165 A | 3/1998 | Philipp | |
| 5,736,976 A | 4/1998 | Cheung | |
| 5,741,990 A | 4/1998 | Davies | |
| 5,745,116 A | 4/1998 | Pisutha-Arnond | |
| 5,745,716 A | 4/1998 | Tchao et al. | |
| 5,748,269 A | 5/1998 | Harris et al. | |
| 5,764,818 A | 6/1998 | Capps et al. | |
| 5,767,457 A | 6/1998 | Gerpheide et al. | |
| 5,767,842 A | 6/1998 | Korth | |
| 5,790,104 A | 8/1998 | Shieh | |
| 5,790,107 A | 8/1998 | Kasser et al. | |
| 5,802,516 A | 9/1998 | Shwarts et al. | |
| 5,808,567 A | 9/1998 | McCloud | |
| 5,809,267 A | 9/1998 | Moran et al. | |
| 5,821,690 A | 10/1998 | Martens et al. | |
| 5,821,930 A | 10/1998 | Hansen | |
| 5,823,782 A | 10/1998 | Marcus et al. | |
| 5,825,351 A | 10/1998 | Tam | |
| 5,825,352 A | 10/1998 | Bisset et al. | |
| 5,854,625 A | 12/1998 | Frisch et al. | |
| 5,880,411 A | 3/1999 | Gillespie et al. | |
| 5,898,434 A | 4/1999 | Small et al. | |
| 5,920,309 A | 7/1999 | Bisset et al. | |
| 5,923,319 A | 7/1999 | Bishop et al. | |
| 5,933,134 A | 8/1999 | Shieh | |
| 5,943,044 A | 8/1999 | Martinelli et al. | |
| 6,002,389 A | 12/1999 | Kasser | |
| 6,002,808 A | 12/1999 | Freeman | |
| 6,020,881 A | 2/2000 | Naughton et al. | |
| 6,031,524 A | 2/2000 | Kunert | |
| 6,037,882 A | 3/2000 | Levy | |
| 6,050,825 A | 4/2000 | Nichol et al. | |
| 6,052,339 A | 4/2000 | Frenkel et al. | |
| 6,072,494 A | 6/2000 | Nguyen | |
| 6,084,576 A | 7/2000 | Leu et al. | |
| 6,107,997 A | 8/2000 | Ure | |
| 6,128,003 A | 10/2000 | Smith et al. | |
| 6,131,047 A | 10/2000 | Hayes, Jr. et al. | |
| 6,131,299 A | 10/2000 | Raab et al. | |
| 6,135,958 A | 10/2000 | Mikula-Curtis et al. | |
| 6,144,380 A | 11/2000 | Shwarts et al. | |
| 6,188,391 B1 | 2/2001 | Seely et al. | |
| 6,198,515 B1 | 3/2001 | Cole | |
| 6,208,329 B1 | 3/2001 | Ballare | |
| 6,222,465 B1 | 4/2001 | Kumar et al. | |
| 6,239,790 B1 | 5/2001 | Martinelli et al. | |
| 6,243,071 B1 | 6/2001 | Shwarts et al. | |
| 6,246,862 B1 | 6/2001 | Grivas et al. | |
| 6,249,606 B1 | 6/2001 | Kiraly et al. | |
| 6,288,707 B1 | 9/2001 | Philipp | |
| 6,289,326 B1 | 9/2001 | LaFleur | |
| 6,292,178 B1 | 9/2001 | Bernstein et al. | |
| 6,297,811 B1 * | 10/2001 | Kent et al. | 345/173 |
| 6,323,846 B1 | 11/2001 | Westerman et al. | |
| 6,347,290 B1 | 2/2002 | Bartlett | |
| 6,377,009 B1 | 4/2002 | Philipp | |
| 6,380,391 B2 | 4/2002 | Gillespie et al. | |
| 6,411,287 B1 | 6/2002 | Scharff et al. | |
| 6,413,233 B1 * | 7/2002 | Sites et al. | 604/6.13 |
| 6,414,671 B1 | 7/2002 | Gillespie et al. | |
| 6,421,234 B1 | 7/2002 | Ricks et al. | |
| 6,452,514 B1 | 9/2002 | Philipp | |
| 6,457,355 B1 | 10/2002 | Philipp | |
| 6,466,036 B1 | 10/2002 | Philipp | |
| 6,466,203 B2 | 10/2002 | Van Ee | |
| 6,515,669 B1 | 2/2003 | Mohri | |
| 6,525,749 B1 | 2/2003 | Moran et al. | |
| 6,535,200 B2 | 3/2003 | Philipp | |
| 6,543,684 B1 | 4/2003 | White et al. | |
| 6,543,947 B2 | 4/2003 | Lee | |
| 6,570,557 B1 | 5/2003 | Westerman et al. | |
| 6,593,916 B1 | 7/2003 | Aroyan | |

| | | |
|---|---|---|
| 6,597,384 B1 | 7/2003 | Harrison |
| 6,610,936 B2 | 8/2003 | Gillespie et al. |
| 6,624,833 B1 | 9/2003 | Kumar et al. |
| 6,639,577 B2 | 10/2003 | Eberhand |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,724,366 B2 | 4/2004 | Crawford |
| 6,757,002 B1 | 6/2004 | Oross et al. |
| D493,157 S | 7/2004 | Yang |
| D493,158 S | 7/2004 | Yang |
| D497,606 S | 10/2004 | Yang |
| 6,803,906 B1 | 10/2004 | Morrison et al. |
| D500,298 S | 12/2004 | Yang |
| 6,842,672 B1 | 1/2005 | Straub et al. |
| 6,888,532 B2 * | 5/2005 | Wong et al. .................. 345/156 |
| 6,888,536 B2 | 5/2005 | Westerman et al. |
| 6,900,795 B1 | 5/2005 | Knight, III et al. |
| 6,909,424 B2 * | 6/2005 | Liebenow et al. ........... 345/169 |
| 6,927,761 B2 | 8/2005 | Badaye et al. |
| D509,819 S | 9/2005 | Yang |
| D509,833 S | 9/2005 | Yang |
| D510,081 S | 9/2005 | Yang |
| 6,942,571 B1 | 9/2005 | McAllister et al. |
| D511,512 S | 11/2005 | Yang |
| D511,528 S | 11/2005 | Yang |
| 6,965,375 B1 | 11/2005 | Gettemy et al. |
| D512,403 S | 12/2005 | Yang |
| D512,435 S | 12/2005 | Yang |
| 6,972,401 B2 | 12/2005 | Akitt et al. |
| 6,977,666 B1 | 12/2005 | Hedrick |
| 6,985,801 B1 | 1/2006 | Straub et al. |
| 6,992,659 B2 | 1/2006 | Gettemy |
| 7,031,228 B2 | 4/2006 | Born et al. |
| D520,516 S | 5/2006 | Yang |
| 7,109,978 B2 * | 9/2006 | Gillespie et al. .............. 345/173 |
| 7,129,416 B1 | 10/2006 | Steinfeld et al. |
| 7,145,552 B2 * | 12/2006 | Hollingsworth ............. 345/168 |
| 7,170,496 B2 | 1/2007 | Middleton |
| 7,240,289 B2 | 7/2007 | Naughton |
| RE40,153 E | 3/2008 | Westerman et al. |
| 2001/0043189 A1 | 11/2001 | Brisebois et al. |
| 2002/0093492 A1 | 7/2002 | Baron |
| 2002/0118848 A1 | 8/2002 | Karpenstein |
| 2003/0006974 A1 | 1/2003 | Clough et al. |
| 2003/0074977 A1 | 4/2003 | Doemens et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0206202 A1 | 11/2003 | Moriya |
| 2003/0234768 A1 | 12/2003 | Rekimoto et al. |
| 2004/0012572 A1 | 1/2004 | Sowden et al. |
| 2004/0263484 A1 | 12/2004 | Mantysalo et al. |
| 2005/0012723 A1 | 1/2005 | Pallakoff |
| 2005/0052425 A1 | 3/2005 | Zadesky et al. |
| 2005/0104867 A1 | 5/2005 | Westerman et al. |
| 2005/0110768 A1 | 5/2005 | Marriott et al. |
| 2005/0146509 A1 * | 7/2005 | Geaghan et al. ............. 345/173 |
| 2005/0154798 A1 | 7/2005 | Nurmi |
| 2005/0212760 A1 | 9/2005 | Marvit et al. |
| 2005/0219228 A1 | 10/2005 | Alameh |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0079969 A1 | 4/2006 | Seguin |
| 2006/0085757 A1 | 4/2006 | Andre et al. |
| 2006/0097991 A1 | 5/2006 | Hotelling et al. |
| 2006/0197753 A1 | 9/2006 | Hotelling |
| 2006/0232567 A1 | 10/2006 | Westerman et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0088602 A1 | 4/2008 | Hotelling |
| 2008/0238879 A1 | 10/2008 | Jaeger et al. |
| 2008/0297476 A1 | 12/2008 | Hotelling et al. |

FOREIGN PATENT DOCUMENTS

| | | |
|---|---|---|
| DE | 10251296 A1 | 5/2004 |
| EP | 0 288 692 | 11/1988 |
| EP | 0 464 908 | 1/1992 |
| EP | 0 664 504 | 7/1995 |
| EP | 1 014 295 | 1/2002 |
| EP | 1 505 484 A1 | 2/2005 |
| GB | 2 393 688 A | 4/2004 |
| JP | 10-228350 A | 8/1998 |
| WO | WO9718547 A1 | 5/1997 |
| WO | WO-97/023738 | 7/1997 |
| WO | WO-98/14863 | 4/1998 |
| WO | WO03088176 A1 | 10/2003 |
| WO | WO-2004/111816 A2 | 12/2004 |
| WO | WO-2004/111816 A3 | 12/2004 |
| WO | WO-2006/023569 | 3/2006 |
| WO | WO-2006/094308 A2 | 9/2006 |
| WO | WO-2006/094308 A3 | 9/2006 |
| WO | WO-2007/103631 A2 | 9/2007 |
| WO | WO-2007/103631 A3 | 9/2007 |

OTHER PUBLICATIONS

Kionx, "KXP84 Series Summary Data Sheet," copyright 2005, dated Oct. 21, 2005, 4-pgs.
EBV Elektronik, "TSOP6238 IR Reciever Modules for Infrared Remote Control Systems," dated Jan. 2004, 1-pg.
Texas Instruments, "TSC2003 / I2C Touch Screen Controller," Data Sheet SBAS 162, dated Oct. 2001, 20-pgs.
European Examination Report mailed Apr. 21, 2008, for EP Application No. 06737515.4, filed Mar. 3, 2006, five pages.
International Search Report mailed Oct. 6, 2006, for PCT Application No. PCT/US2006/08349, filed Mar. 3, 2006, three pages.
International Search Report mailed Jan. 3, 2008, for PCT Application No. PCT/US2007/062474, filed Feb. 21, 2007, three pages.
Press Release, "iriver clix Delivers Complete Package for Portable Entertainment Fans," obtained from www. iriveramerica.com/images/pdf/iriv_clix.pdf, dated May 17, 2006, 3-pages.
iriver clix Product Guide, copyright 1999-2006, 38-pages.
iriver clix Quick Start Guide, undated, 2-pages.
Gear Live Review: iRiver clix Review, obtained from http://www.gearlive.com/index.php/news/article/gear-live-review-iriver-clix-review-713400/, dated Jul. 13, 2006, 8-pages.
Anonymous. "Touch Technologies Overview" 2001, 3M Touch Systems, Massachusetts.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.

Anonymous. "A Brief Overview of Gesture Recognition" obtained from http://www. Dai. Ed. Ac.uk/Cvonline/LOCA_COPIES/COHEN/gesture_overview. Html, generated Apr. 20, 2004.

Anonymous. "Capacitive Position Sensing" obtained from http://www.synaptics.com/technology/cps.cfin generated Aug. 5, 2005.

Anonymous. "Capacitive Touchscreens" obtained from http://www.touchscreens.com/intro-touchtypes-capacitive.html generated Aug. 5, 2005.

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004, 1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip.html, generated on Aug. 27, 2004, 2-pg.

Anonymous. "FingerWorks_Gesture Guide_Tips and Tricks," obtained from http://www.fingerworks.com/gesture_guide_tips.html, generated Aug. 27, 2004, 2-pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from http://www.fingerworks.com/resting.html, Copyright 2001, 1-pg.

Anonymous. "FingerWorks—Tips for Typing on the Mini," obtained from http://www.fingerworks.com/mini_typing.html, generated on Aug. 27, 2004, 2-pgs.

Anonymous. "GlidePoint®" obtained from http://www.cirque.com/technology/technology_qp.html generated Aug. 5, 2005.

Anonymous. "Gesture Recognition" http://www.fingerworks.com/gesture_recognition.html1>, Jul. 2, 2006.

Anonymous. "How do touchscreen monitors know where you're touching?" obtained from http://www.electronics.howstuffworks.com/question716.html generated Aug. 5, 2005.

Anonymous. "How does a touchscreen work?" obtained from http://www.touchscreens.com/intro-anatomy.html generated Aug. 5, 2005.

Anonymous. "iGesture Pad—the MultiFinger USB TouchPad with Whole-Hand Gestures,"obtained from http://www.fingerworks.com/igesture.html, generated Aug. 27, 2004, 2-pgs.

Anonymous. "iGesture Products for Everyone (learn in minutes) Product Overview"FingerWorks.com downloaded Aug. 30, 2005.

Anonymous. "Infrared Touchscreens" obtained from http://www.touchscreens.com/intro-touchtypes-infrared.html generated Aug. 5, 2005.

Anonymous. "Mouse Emulation" FingerWorks obtained from http://www.fingerworks.com/gesture_guide_mouse.html generated Aug. 30, 2005.

Anonymous. "Mouse Gestures in Opera" obtained from http://www.opera.com/products/desktop/mouse/index.dml generated Aug. 30, 2005.

Anonymous. "Mouse Gestures," Optim oz, May 21, 2004.

Anonymous. "MultiTouch Overview" FingerWorks obtained from http://finger.works.com/multoverview.html generated Aug. 30, 2005.

Anonymous. "Near Field Imaging Touchscreens" obtained from http://www.touchscreens.com/intro-touchtypes-nfi.html generated Aug. 5, 2005.

Anonymous. "PenTouch Capacitive Touchscreens" obtained from http://www.touchscreens.com/intro-touchtypes-pentouch.html generated Aug. 5, 2005.

Anonymous. "Surface Acoustic Wave Touchscreens" obtained from http://www.touchscreens.com/intro-touchtypes-saw.html generated Aug. 5, 2005.

Anonymous. "Symbol Commander" obtained from http://www.sensiva.com/symbolcommander/, generated Aug. 30, 2005.

Anonymous. "Tips for Typing" FingerWorks http://www.fingerworks.com/mini_typing.html generated Aug. 30, 2005.

Anonymous. "Wacom Components—Technology" obtained from http://www.wacom-components.com/english/tech.asp generated on Oct. 10, 2004.

Anonymous. "Watershed Algorithm" http://rsb.info.nih.gov/ij/plugins/watershed.html generated Aug. 5, 2005.

Bier et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report received in EP 1 621 989 (@ *Beyer Weaver & Thomas, LLP*) dated Mar. 27, 2006.

Fisher et al., "Repetitive Motion Disorders: The Design of Optimal Rate- Rest Profiles," Human Factors, 35(2):283-304 (Jun. 1993).

Fukumoto and Yoshinobu Tonomura, "Body Coupled Fingering: Wireless Wearable Keyboard," *CHI97*, pp. 147-154 (Mar. 1997).

Fukumoto et al., "ActiveClick: Tactile Feedback for Touch Panels," In CHI 2001 Summary, pp. 121-122, 2001.

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

Lee, "A Fast Multiple-Touch-Sensitive Input Device," Master's Thesis, University of Toronto (1984).

Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-251.]

Matsushita et al., "HoloWall: Designing a Finger, Hand, Body and Object Sensitive Wall," In Proceedings of UIST '97, Oct. 1997.

Non-Final Office Action mailed Feb. 26, 2009, for U.S. Appl. No. 11/367,749, filed Mar. 3, 2006, 10 pages.

Quek, "Unencumbered Gestural Interaction," *IEEE Multimedia*, 3:36-47 (Winter 1996).

Radwin, "Activation Force and Travel Effects on Overexertion in Repetitive Key Tapping," *Human Factors*, 39(1):130-140 (Mar. 1997).

Rekimoto et al., "ToolStone: Effective Use of the Physical Manipulation Vocabularies of Input Devices," In Proc. Of UIST 2000.

Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.]

Rubine et al., "Programmable Finger-Tracking Instrument Controllers," *Computer Music Journal*, vol. 14, No. 1 (Spring 1990).

Rutledge et al., "Force-To-Motion Functions for Pointing," Human-Computer Interaction—INTERACT (1990).

Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).

U.S. Appl. No. 10/789,676, filed Feb. 27, 2004 entitled "Shape Detecting Input Device".

U.S. Appl. No. 11/332,861, filed Jan. 13, 2006, which is a Reissue of 6,677,932.

Wellner, "The Digital Desk Calculators: Tangible Manipulation on a Desk Top Display"In ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI' 97 Extended Abstracts* (1997).

Zimmerman et al., "Applying Electric Field Sensing to Human-Computer Interfaces," In CHI '85 Proceedings, pp. 280-287, 1995.

Final Office Action mailed Aug. 25, 2009, for U.S. Appl. No. 11/367,749, filed Mar. 3, 2006, 12 pages.

* cited by examiner

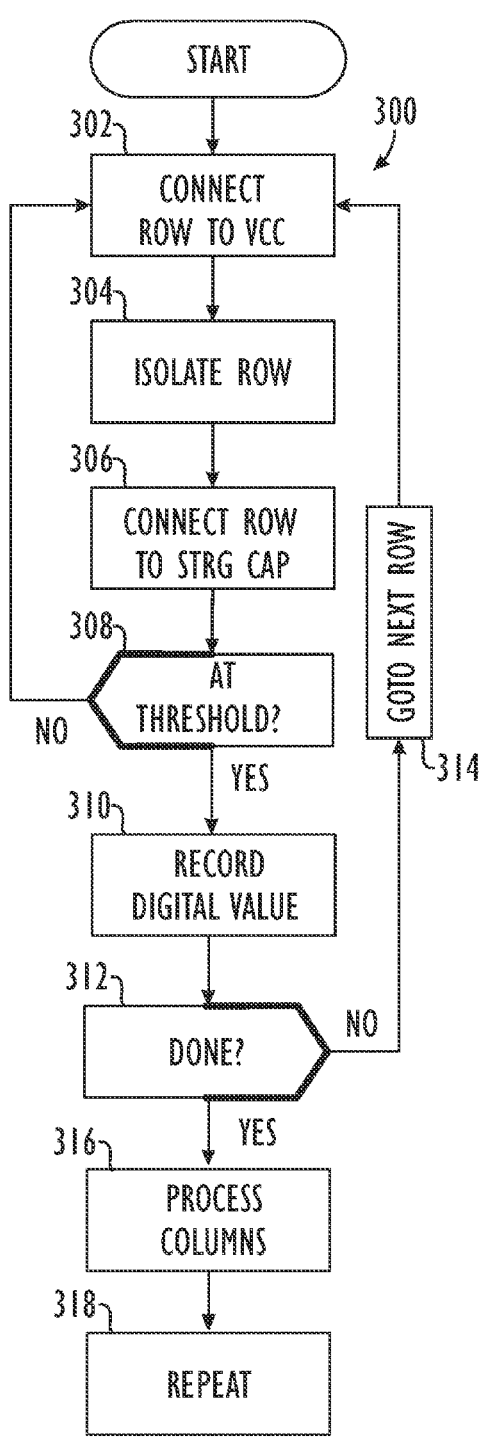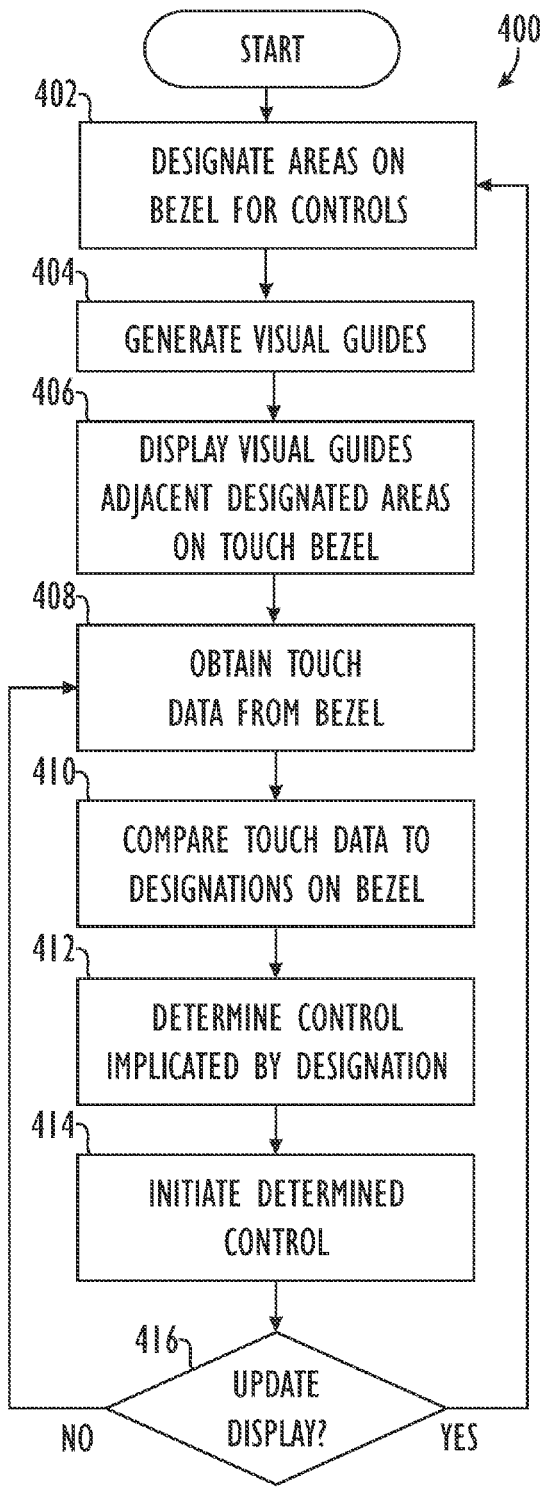
*FIG. 6*
*FIG. 7*

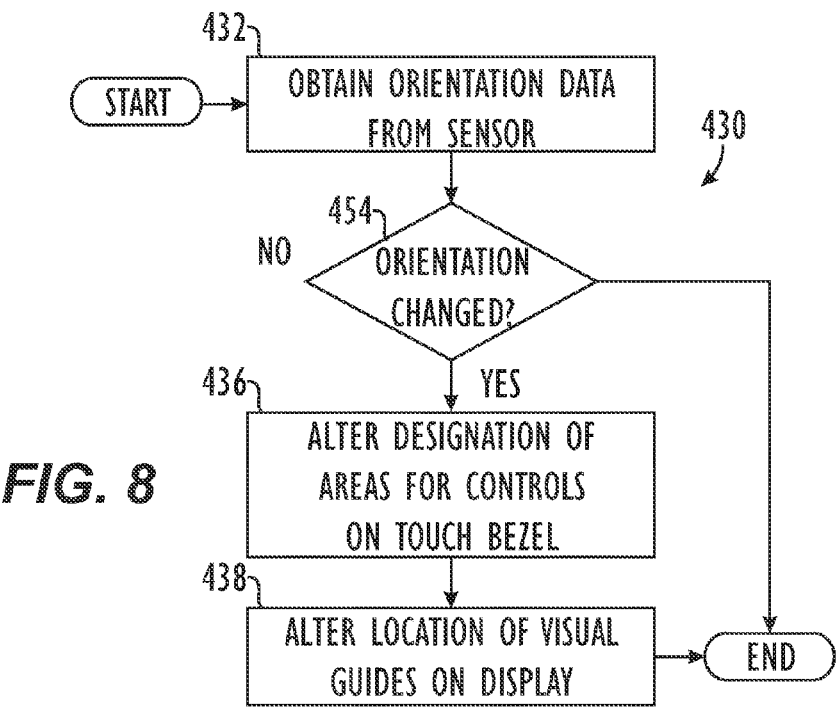
FIG. 8
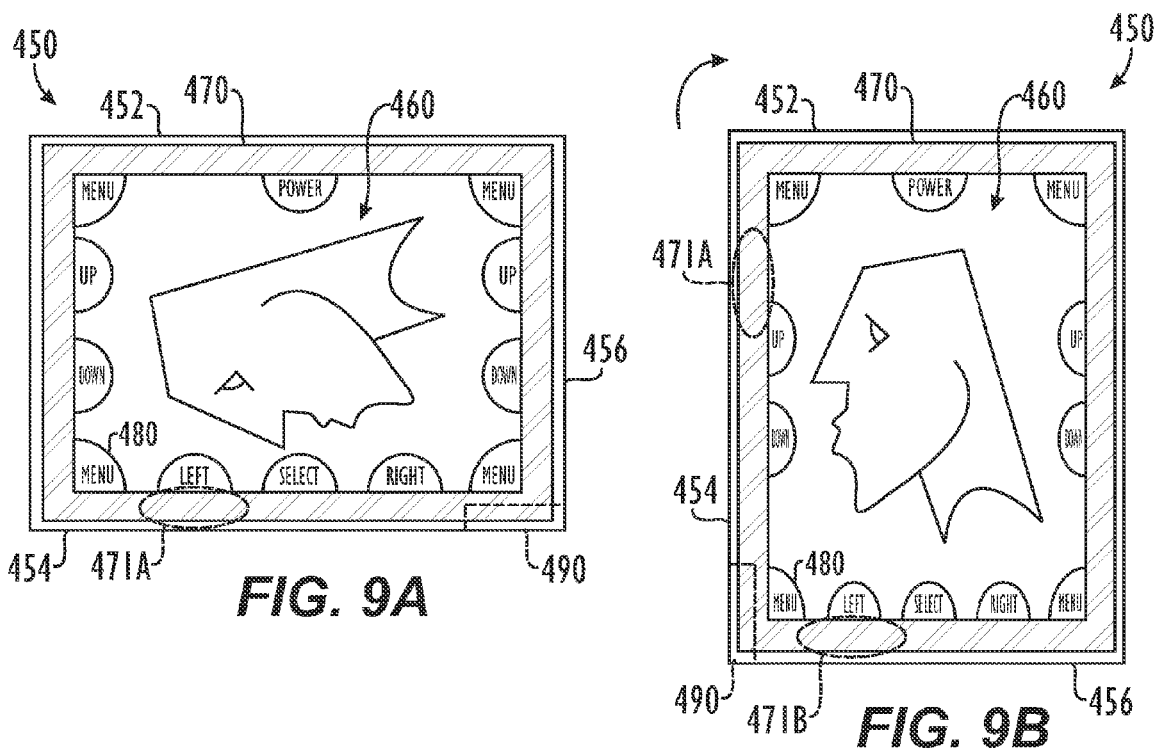
FIG. 9A
FIG. 9B

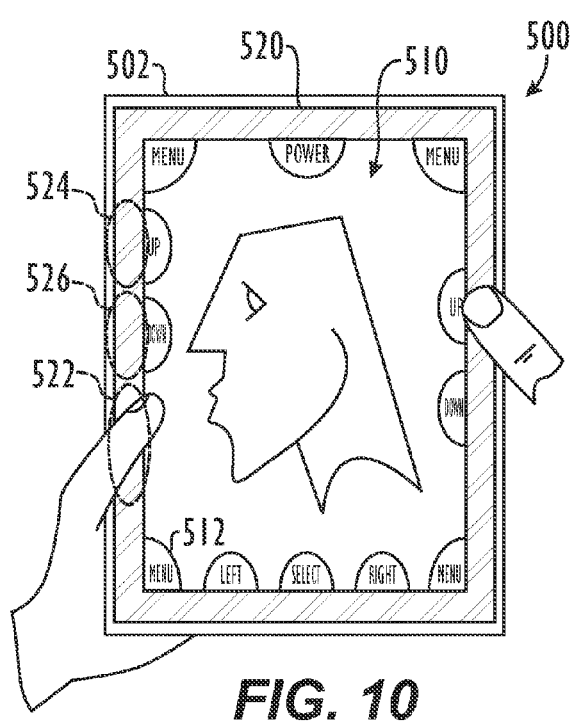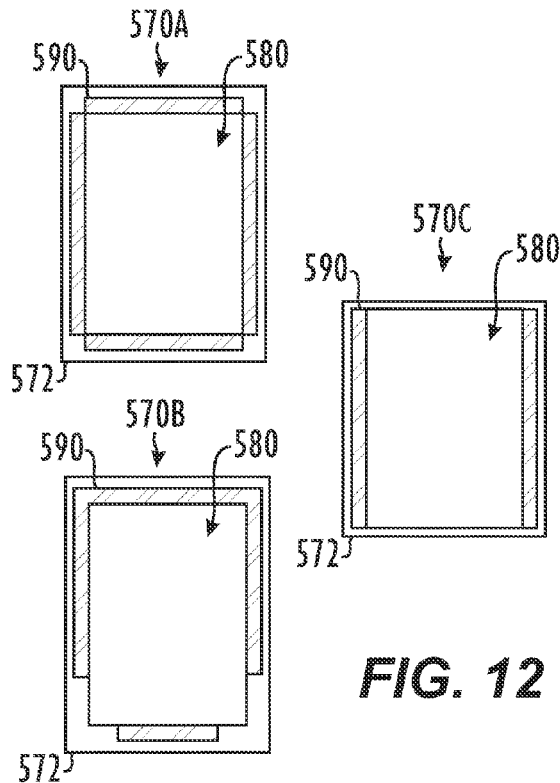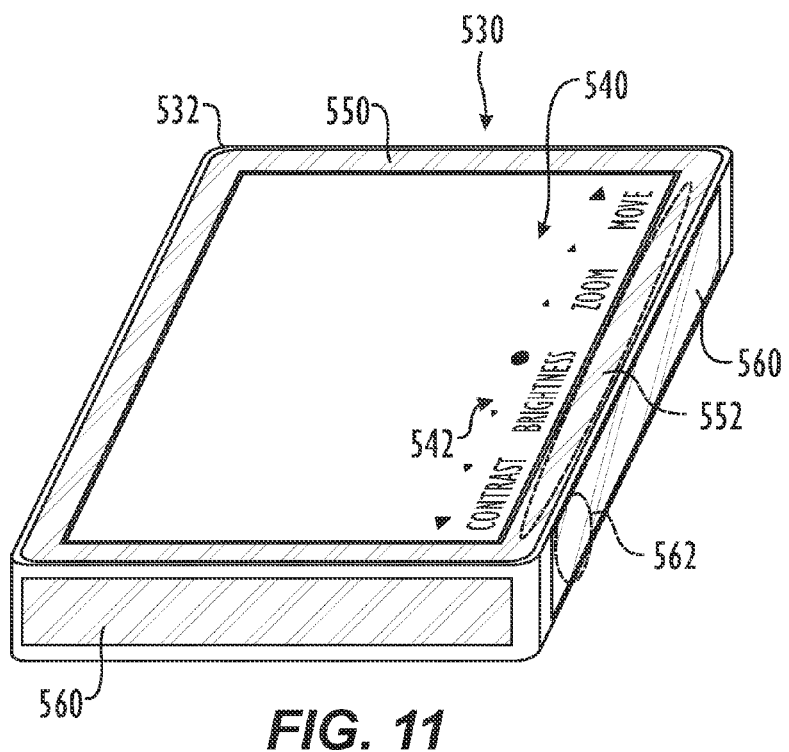

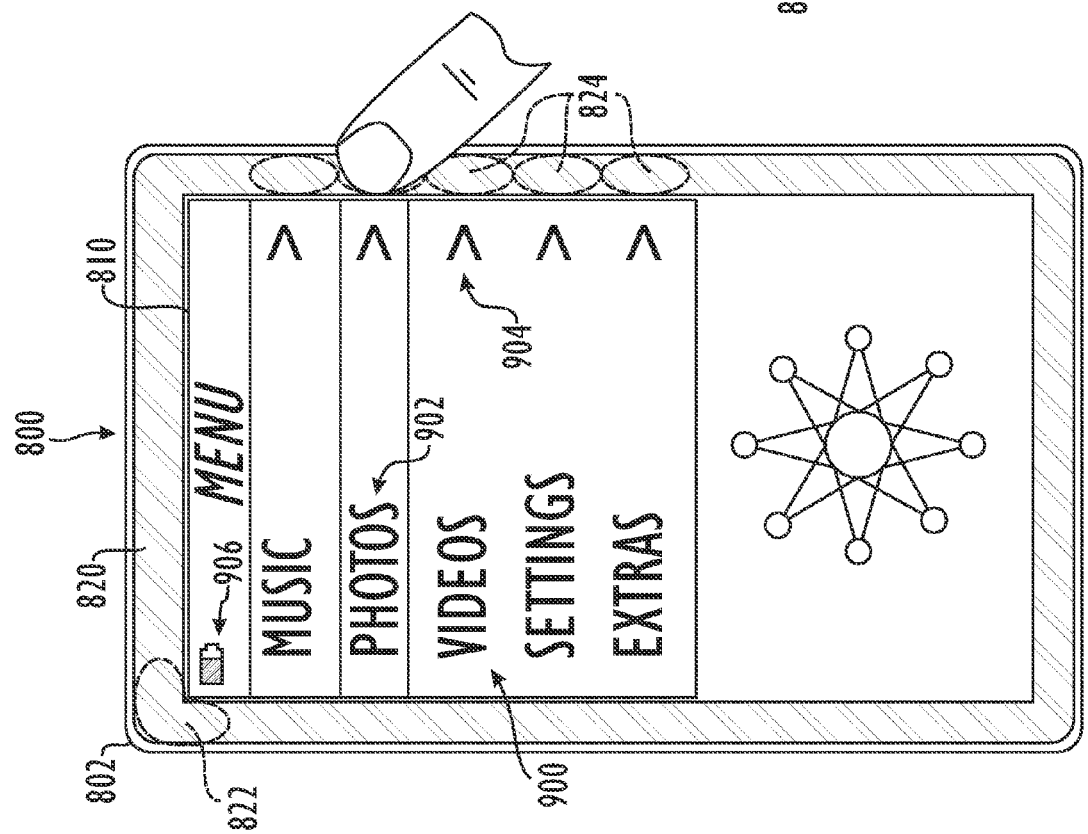
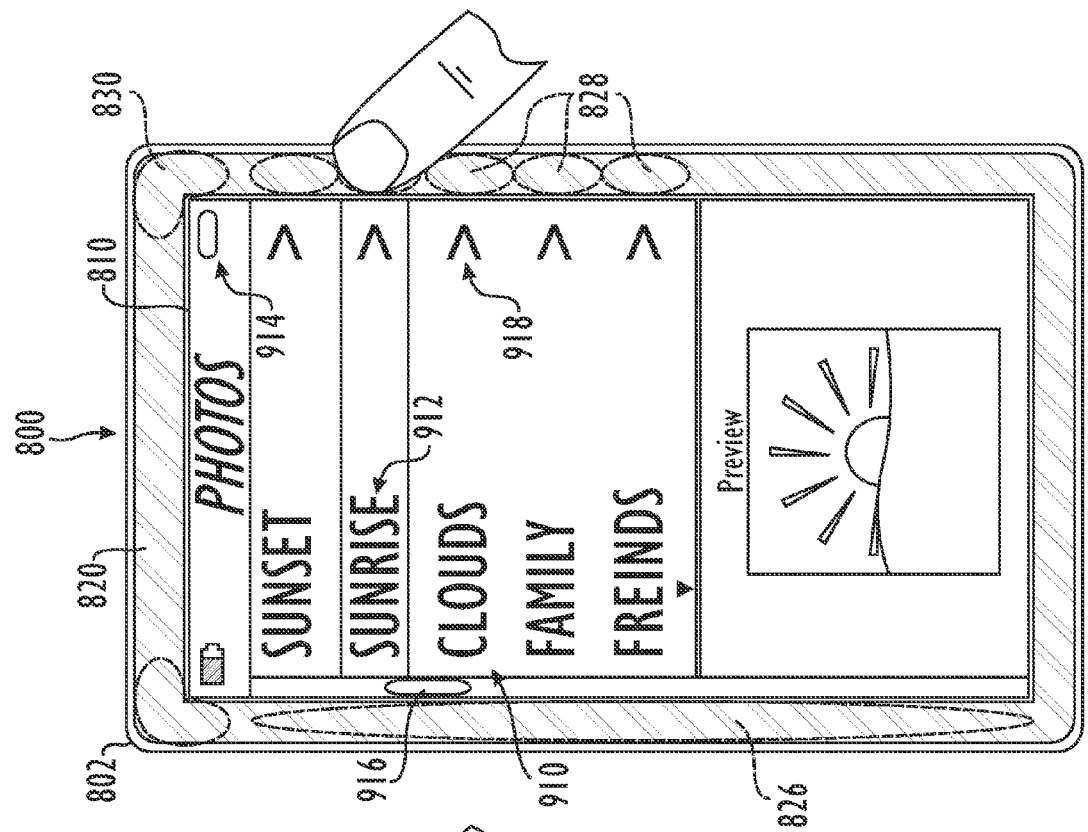
FIG. 15
FIG. 16

ELECTRONIC DEVICE HAVING DISPLAY AND SURROUNDING TOUCH SENSITIVE BEZEL FOR USER INTERFACE AND CONTROL

CROSS-REFERENCE TO RELATED APPLICATIONS

This is a continuation-in-part of U.S. patent application Ser. No. 11/367,749, filed Mar. 3, 2006 and entitled "Multi-Functional Hand-Held Device," which is incorporated herein by reference in its entirety, to which priority is claimed, and which claims priority to: (1) U.S. Provisional Patent Application No. 60/658,777, entitled "Multi-Functional Hand-Held Device," filed Mar. 4, 2005 and (2) U.S. Provisional Patent Application No. 60/663,345, entitle titled "Multi-Functional Hand-Held Device," filed Mar. 16, 2005, each of which is hereby incorporated by reference.

This application is also related to the following applications, which are all herein incorporated by reference: (1) U.S. patent application Ser. No. 10/188,182, entitled "Touch Pad for Handheld Device," filed on Jul. 1, 2002; (2) U.S. patent application Ser. No. 10/722,948, entitled "Touch Pad for Handheld Device," filed on Nov. 25, 2003; (3) U.S. patent application Ser. No. 10/643,256, entitled "Movable Touch Pad with Added Functionality," filed on Aug. 18, 2003; (4) U.S. patent application Ser. No. 10/654,108, entitled "Ambidextrous Mouse," filed on Sep. 2, 2003; (5) U.S. patent application Ser. No. 10/840,862, entitled "Multipoint Touch Screen," filed on May 6, 2004; (6) U.S. patent application Ser. No. 10/903,964, entitled "Gestures for Touch Sensitive Input Devices," filed on Jul. 30, 2004; (7) U.S. patent application Ser. No. 11/038,590, entitled "Mode-Based Graphical User Interfaces for Touch Sensitive Input Devices," filed on Jan. 18, 2005; and (8) U.S. patent application Ser. No. 11/057,050, entitled "Display Actuator," filed on Feb. 11, 2005, (9) U.S. patent application Ser. No. 11/115,539, entitled "Hand-Held Electronic Device with Multiple Touch Sensing Devices," filed Apr. 26, 2005.

FIELD OF THE DISCLOSURE

The subject matter of the present disclosure relates to an electronic device having a display and a surrounding touch sensitive bezel for user interface and control.

BACKGROUND OF THE DISCLOSURE

There exist today many types of hand-held electronic devices, each of which utilizes some sort of user interface. The user interface typically includes an output device in the form of a display, such as a Liquid Crystal Display (LCD), and one or more input devices, which can be mechanically actuated (e.g., switches, buttons, keys, dials, joysticks, joy pads) or electrically activated (e.g., touch pads or touch screens). The display is typically configured to present visual information such as text and graphics, and the input devices are typically configured to perform operations such as issuing commands, making selections, or moving a cursor or selector of the electronic device. Each of these well-known devices has considerations such as size and shape limitations, costs, functionality, complexity, etc. that must be taken into account when designing the hand-held electronic device. In most cases, the user interface is positioned on the front face (or front surface) of the hand-held device for easy viewing of the display and easy manipulation of the input devices.

FIGS. 1A-1F are diagrams of various hand-held electronic devices including for example a telephone 10A (FIG. 1A), a PDA 10B (FIG. 1B), a media player 10C (FIG. 1C), a remote control 10D (FIG. 1D), a camera 10E (FIG. 1E), and a Global Positioning System (GPS) module 10F (FIG. 1F). In each of these devices 10, a display 12, which is secured inside the housing of the device 10 and which can be seen through an opening in the housing, is typically positioned in a first region of the electronic device 10. Each of these devices 10 also include one or more input devices 14, which are typically positioned in a second region of the electronic device 10 next to the display 12.

To elaborate, the telephone 10A typically includes a display 12 such as a character or graphical display, and input devices 14 such as a number pad and in some cases a navigation pad. The PDA 10B typically includes a display 12 such as a graphical display, and input devices 14 such as a stylus based resistive touch screen and buttons. The media player 10C typically includes a display 12 such as a character or graphic display and input devices 14 such as buttons or wheels. The iPod® media player manufactured by Apple Computer, Inc. of Cupertino, California is one example of a media player that includes both a display and input devices disposed next to the display. The remote control 10D typically includes an input device 14 such as a keypad and may or may not have a character display 12. The camera 10E typically includes a display 12 such as a graphic display and input devices 14 such as buttons. The GPS module 10F typically includes a display 12 such as graphic display and input devices 14 such as buttons, and in some cases a joy pad.

Such prior art devices 10A-10F often employ a user interface in conjunction with the display 12 and input device 14. In one example, FIG. 2A shows an electronic device 20, such as a portable media player. The electronic device 20 has a display 24 and an input device 26 according to the prior art. The display 22 can show various forms of information (e.g., menu items, song titles stored in memory, etc.) of a user interface. The display 24 and input device 26 used in conjunction with the user interface allows the user to make selections (e.g., select a song), to operate functions of the device (e.g., play, stop, or pause a song, etc.), and to perform other functions. In this device 20, the input devices 26 is a "click wheel," such as used on an iPod® media player manufactured by Apple Computer, Inc. of Cupertino, Calif.

The electronic device 20 has a housing 22 that contains the display 24 and the input device 26. The input device 26 typically requires a number of components, such as pressure pads, printed circuit board, integrated circuits, etc. Accordingly, the housing 22 for the electronic device 20 must typically be extended or enlarged beyond the size of the display 24 so that the electronic device 20 can accommodate the components of the input device 26. Consequently, due to the required components for the input device 26, the size of the housing 22 may in some cases be larger than is actually required to house just the display 24 and any other necessary components (i.e., processor, memory, power supply, etc.) for the device 20. In addition, placement of the display 22 and the input device 26 typically accommodate only one orientation of the device 20 when held by a user.

In another example, FIG. 2B shows another electronic device 30 having a display 34 and an input device 36 according to the prior art. The electronic device 30 can be a laptop computer or the like, and the input device 36 can be a touch pad used to control functions of the device 30, such as moving a cursor, making selections, etc. The touch pad 36 is positioned on a housing 32 of the device 30 in conjunction with conventional components of a keyboard 38 and other physical inputs. The touch pad 36 can be categorized as either "resistive" or "capacitive." In the resistive category, the touch pad 36 is coated with a thin metallic electrically conductive layer and a resistive layer. When the touch pad 36 is touched, the conductive layers come into contact through the resistive layer causing a change in resistance (typically measured as a change in current) that is used to identify where on the touch pad 36 the touch event occurred. In the capacitive category, a first set of conductive traces run in a first direction on the touch pad 36 and are insulated by a dielectric insulator from a second set of conductive traces running in a second direction (generally orthogonal to the first direction) on the touch pad 36. The grid formed by the overlapping conductive traces creates an array of capacitors that can store electrical charge. When an object (e.g., a user's finger) is brought into proximity or contact with the touch pad 36, the capacitance of the capacitors at that location changes. This change can then be used to identify the location of the touch event.

In yet another example, FIG. 2C illustrates an electronic device 40 having a touch screen display 44 according to the prior art as an input device. The electronic device 40 is a Personal Digital Assistant or the like. The touch screen display 44 is positioned on a housing 42, and the electronic device 40 typically has some physical controls 46 on the housing 42. A stylus 48 is used to touch locations of the touch screen display 44 to perform various functions. The stylus 48 is typically used like a mouse and arrow, and the display 44 can show various menu items and other user interface features. Touching a menu item on the display 44 with the stylus 48 can generate a pop-up or window 45 in which the user can then make a selection with the stylus 48. The pop-ups or windows 45 overlay the content being displayed and tend to obscure it.

Recently, traditionally separate hand-held electronic devices have begun to be combined in limited ways. For example, the functionalities of a telephone have been combined with the functionalities of a PDA. One problem that has been encountered is in the way inputs are made into the device. Each of these devices has a particular set of input mechanisms or devices for providing inputs into the device. Some of these input mechanisms are generic to all the devices (e.g., power button) while others are not. The ones that are not generic are typically dedicated to a particular functionality of the device. By way of example, PDAs typically include a touch screen and a few dedicated buttons while cell phones typically include a numeric keypad and at least two dedicated buttons.

Thus, it is a challenge to design a device with limited input mechanisms without adversely affecting the numerous possible functions that the device can perform. As will be appreciated, it is preferable not to overload the electronic devices with a large number of input mechanisms as this tends to confuse the user and to take up valuable space, i.e., "real estate." In the case of hand-held devices, space is at a premium because of their small size. At some point, there is not enough space on the device to house all the necessary buttons and switches, etc. This is especially true when considering that all these devices need a display that typically takes up a large amount of space on its own. To increase the number of input devices beyond some level, designers would have to decrease the size of the display. However, this will often leave a negative impression on the user because the user typically desires the largest display possible. Alternatively, to accommodate more input devices designers may opt to increase the size of the device. This, too, will often leave a negative impression on a user because it would make one-handed operations difficult, and at some point, the size of the device becomes so large that it is no longer considered a hand-held device.

Therefore, what is needed in the art is an improved user interface that works for multi-functional hand-held devices.

SUMMARY OF THE DISCLOSURE

An electronic device has a display and has a touch sensitive bezel surrounding the display. Areas on the bezel are designated for controls used to operate the electronic device. Visual guides corresponding to the controls are displayed on the display adjacent the areas of the bezel designated for the controls. Touch data is generated by the bezel when a user touches an area of the bezel. The device determines which of the controls has been selected based on which designated area is associated with the touch data from the bezel. The device then initiates the determined control. The device can also have a sensor for determining the orientation of the device. Based on the orientation, the device can alter the areas designated on the bezel for the controls and can alter the location of the visual guides for the display so that they match the altered areas on the bezel if the orientation of the device has changed.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 3B is a front view of the hand-held device of FIG. 3A with at least one button.

FIG. 6 illustrates a process of operating the touch sensitive bezel in flow chart form.

FIG. 7 illustrates a process of operating the electronic device in flow chart form.

FIG. 8 illustrates a process of operating the electronic device having an orientation sensor in flow chart form.

FIGS. 9A-9B illustrate an electronic device with an orientation sensor in two different orientations.

FIG. 10 illustrates an embodiment of an electronic device capable of disregarding certain types of touch data.

FIG. 11 illustrates an embodiment of an electronic device having a touch sensitive bezel around the display and having addition touch sensitive pads incorporated throughout various sides of the housing for the device.

FIG. 12 illustrates some other possible bezel arrangements for an electronic device according to the present disclosure.

FIGS. 15 through 19 illustrate an embodiment of a multimedia device having a touch sensitive bezel and a user interface according to certain teachings of the present disclosure.

Figure 1A:
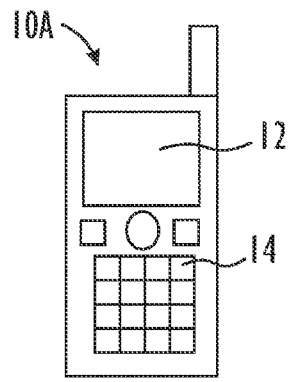
FIGS. 1A-1F are diagrams of various electronic devices according to the prior art.
Figure 1B:
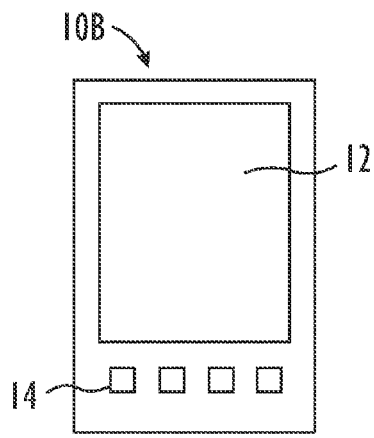
Figure 1C:
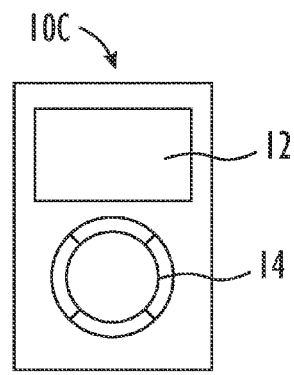
Figure 1D:
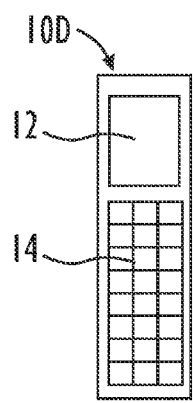
Figure 1E:
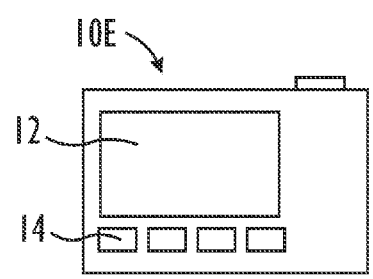
Figure 1F:
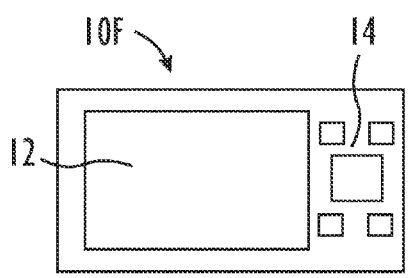
Figure 2A:
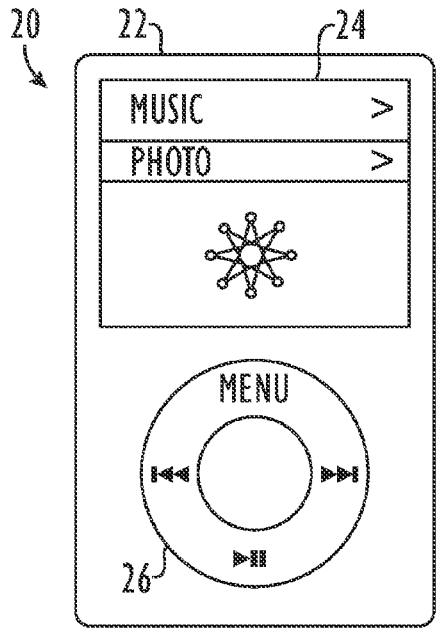
FIG. 2A illustrates an electronic device having a display and user controls according to the prior art.
Figure 2B:
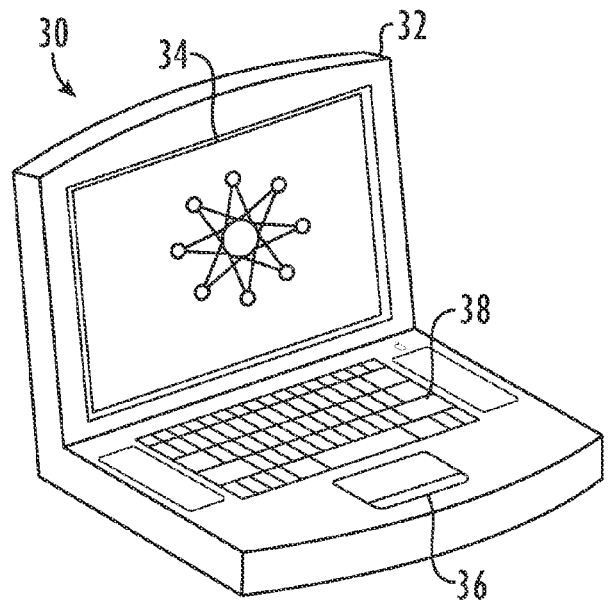
FIG. 2B illustrates an electronic device having a display and a touch pad according to the prior art.
Figure 2C:
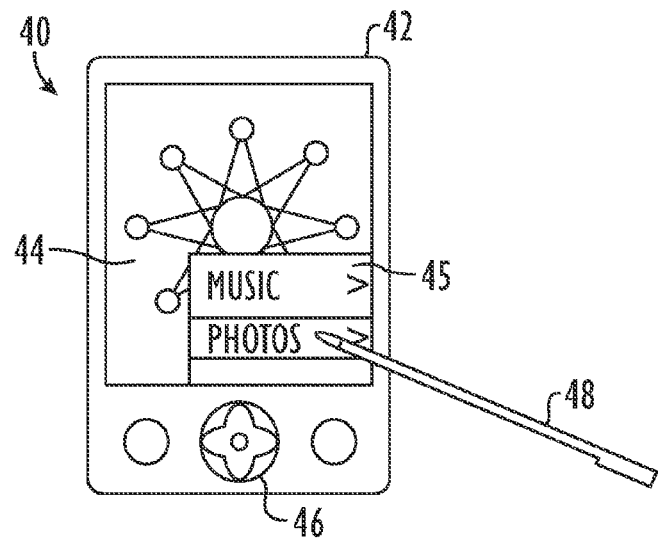
FIG. 2C illustrates an electronic device having a touch screen display according to the prior art.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Co-pending U.S. patent application Ser. No. 11/367,749, which has been incorporated herein by reference in its entirety, discloses electronic devices capable of configuring user inputs based on how the devices are to be used. The electronic devices may be multi-functional hand-held devices. The electronic devices have a user interface that requires no (or at most only a few) physical buttons, keys, or switches so that the display size of the electronic devices can be substantially increased. Preferably, the electronic devices eliminate such physical buttons, keys, or switches from a front surface of the electronic device so that additional surface area becomes available for a larger display on the electronic device. Ultimately, this strategy allows the electronic device to house a substantially full screen display. As used herein, a full screen display is a display that consumes, or at least dominates, a surface (e.g., a front surface) of the electronic device.

Figure 3A:
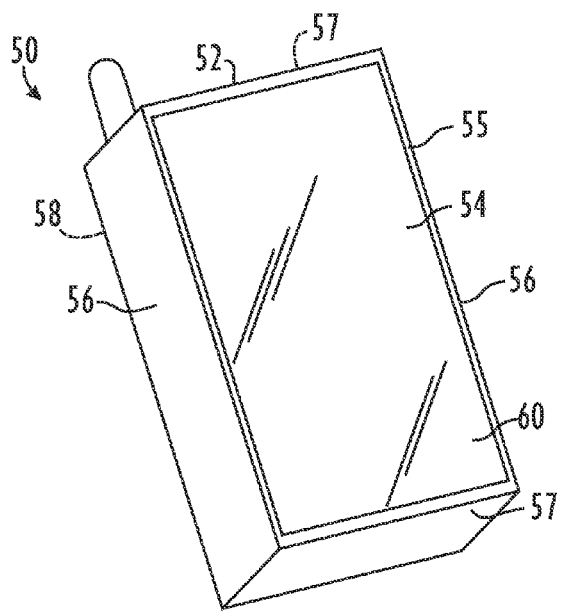
FIG. 3A is a perspective view of a substantially full screen hand-held device with a limited number of buttons according to certain teachings of the present disclosure.

FIG. 3A is a perspective view of a multi-functional hand-held device 50 having a housing 52 and a substantially full screen display 60. To accommodate the full screen display 60, the multi-functional hand-held device 50 is preferably configured with a limited number of physical buttons. Because a limited number of physical buttons are provided, the display 60 of the hand-held device 50 preferably uses a touch screen as the primary input mechanism for the electronic device 50. The touch screen of the display 60 is a transparent touch sensing mechanism that is positioned over or incorporated into the display 60. Typically, the touch screen display 60 works in conjunction with a graphical user interface (GUI) presented on the display 60. For example, the GUI may present an on-screen button or user control on the display 60, and the touch screen display 60 may detect when a user presses the on-screen button (e.g., places their finger or stylus over the on-screen button). Aspects of the touch screen display 60 and GUI for the electronic device 50 are described in greater detail below.

The hand-held device 50 may be constructed with only cross-functional physical buttons, i.e., there are no buttons dedicated to individual device functionalities. These types of buttons may include power buttons and hold switches. In another embodiment, the hand-held device 50 may not include any physical buttons at all. In some embodiments, the physical buttons are limited to only the sides 56 and back surface 58 of the hand-held device 50. In other embodiments, the physical buttons of the hand-held device 50 are limited to the upper and lower portion of the sides 56 so that there are no buttons in the regions of the sides 56 where a user would physically support the device 50 (i.e., holding region). In still other embodiments, the physical buttons may be located on the front surface 54, but only in the bezel 55 surrounding the display 60. In some embodiments, the buttons may be located on only the top and bottom surfaces 57 of the device 50.

As shown in the embodiment of FIG. 3A, there are no physical buttons on the front surface 54 of the housing 52 so that the front surface 54 can be used almost entirely for the display 60. Further, because the side surfaces 56 are used for grasping the device 50, it may be preferred to leave the sides surfaces 56 free from buttons to prevent accidental actions in the event a user inadvertently presses a button while supporting the device 50. Although the top and bottom surfaces 57 would not typically be used to hold the device 50, these surfaces 57 are not ideal locations for buttons that are often actuated because it would be awkward to reach these buttons when operating the device 50 with one hand. Instead, the top surface 57 may be reserved for buttons that have limited action and generic functions that are cross-functional, for example, power and hold switches. The top and bottom surfaces 57 are also well suited for placement of I/O and communication ports. The top surface 57 may, for example, include a headset/microphone jack and an antenna, and the bottom surface 57 may include power and data ports.

In some cases, it may be desirable to place buttons in the upper or lower regions of the side surfaces 56 out of the way of the grasping hand of the user. This may be particularly well suited when the housing 52 of the device 50 is elongated more than the standard width of a user's grasping hand. As shown in FIG. 3B, the hand-held device 50 includes a button 53 in the upper region on the right side surface 54 of the housing 52. Because the button 53 is in the upper region, it tends to be out of the way of the grasping hand and therefore accidental activation is substantially eliminated. In one embodiment, the upper button 53 may be configured to switch the functionality of the multi-functional device 50. For example, by pressing the button 53, a new device functionality is activated, and the current device functionality is deactivated. Although the term "button" is used, it should be appreciated that the button 53 may correspond to a dial, wheel, switch, or the like.

Figure 3C:
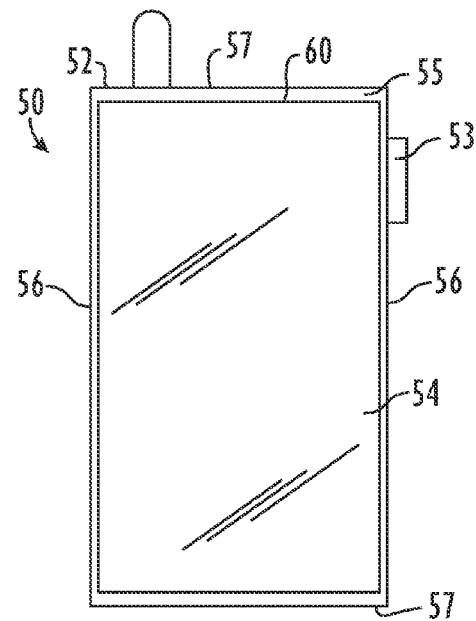
FIG. 3C is a diagram of a graphical user interface separated into a standard region and a control region for the electronic device of FIG. 3A.
Figure 3C:
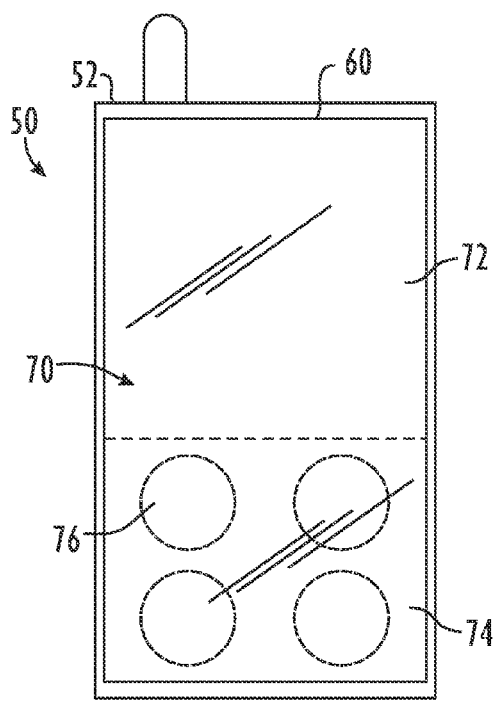

As discussed above, the touch screen display 60 typically works in conjunction with a GUI presented on the display 50. The GUI shows user controls on the touch screen display 60, which in turn responds to user touches made in regions of the touch screen display 60 corresponding to the displayed user controls. The entire touch screen display 60 or only a portion may be used to show the user controls. Referring to FIG. 3C, for example, a GUI 70 for the electronic device 50 of FIG. 3A is separated into a standard region 72 and a control region 74 on the touch screen display 60. The standard region 72 represents what would normally be displayed on the display 60 when using the electronic device 50. That is, any standard GUI screens associated with the device 50 are displayed in the standard region 72. For example, when the device 50 is operated with a PDA functionality, a main menu (window with a set of icons), calendar, address book or date book may be displayed in the standard region 72.

On the other hand, the control region 74 virtually represents those physical controls 76 that would normally be physically placed on a particular type of electronic device. That is, the virtual controls 76 displayed in the control region 74 essentially mimic physical controls for a particular type of device. For example, when the device 50 is operated with a PDA functionality, the control region 74 may include virtual representations of a hand writing recognition area, a navigation pad, and the standard function buttons. The standard and control regions 72 and 74 can be positioned at any position on the display 60 (top, bottom, sides, center, etc.). For example, as shown in FIG. 3C, the control regions 72 and 74 may be positioned vertically relative to one another (one on top of the other) on the display 60.

Figure 3D:
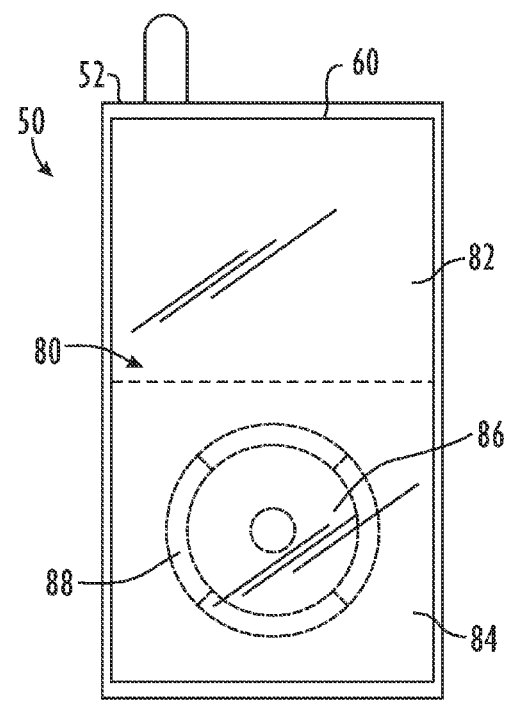
FIG. 3D illustrates an exemplary media player interface for the electronic device of FIG. 3A.

In another example, FIG. 3D is a diagram of a GUI 80 that can be used with the electronic device 50 when operated in a music player functionality. Again, the GUI 80 is divided into a standard region 82 and a control region 84. Located inside the control region 84 are a virtual scroll wheel 86 and five virtual buttons 88. Additional details on a virtual scroll wheel 86 are provided in U.S. patent application Ser. No. 11/038, 590, entitled "Mode-Based Graphical User Interfaces for Touch Sensitive Input Devices," filed on Jan. 18, 2005, which has been incorporated herein by reference.

In the embodiments of FIGS. 3A-3D, the electronic device 50 includes the touch screen display 60. In additional embodiments, the electronic device 50 according to certain teachings of the present disclosure may incorporate one or more touch sensitive surfaces (not shown) on the housing 52 of the electronic device 50 itself. These touch sensitive surfaces (not shown) can provide a large surface for tracking touch inputs or can provide small-dedicated areas, such as touch buttons, for performing dedicated functions. Furthermore, the one or more touch sensitive surfaces can be used in addition to or in the alternative to the touch screen display 60 discussed in the embodiment of FIGS. 3A-3D.

The touch sensitive surfaces may be located on any surface of the housing 52, any side of the housing 52, any portion of any side of the housing 52, or at dedicated locations on the surface of the housing 52. For example, the touch sensitive surfaces may be located on the sides 56 or back surface 58 of the housing 52 and may even be located at the bezel (55; FIGS. 3A-3B) located at the front surface 54 of the housing 52. In all of these cases, a large portion of the front surface 54 of the housing 52 is saved for the display 60 so that the viewing area of the hand-held electronic device 50 can be maximized.

The touch sensitive surfaces of the housing 52 may take the form of one or more touch panels that are positioned within the housing 52. The touch sensitive surfaces may be alternatively or additionally be provided directly by the housing 52. That is, the touch sensing components of the touch sensitive surfaces may be integrated into, incorporated into, or disposed underneath the housing 52 such that the housing 52 itself is touch sensitive and forms part of the touch sensitive surfaces (rather than using a separate touch panel). Similar to a touch screen, such touch sensitive surfaces recognize touches and the positions of the touches on the surfaces. The electronic device 50 has circuitry (not shown), which can include a controller or the like, and the circuitry interprets the touches and thereafter performs actions based on the touch events. Touch sensitive surfaces can be constructed in the same manner as a touch screen, except the surfaces need not be substantially transparent. By way of example, the touch sensitive surfaces for the electronic device 50 may generally correspond to the touch sensitive housing described in detail in U.S. patent application Ser. No. 11/115,539, entitled "Hand-Held Electronic Device with Multiple Touch Sensing Devices," filed Apr. 26, 2005, which has been incorporated herein by reference in its entirety.

Figure 4:
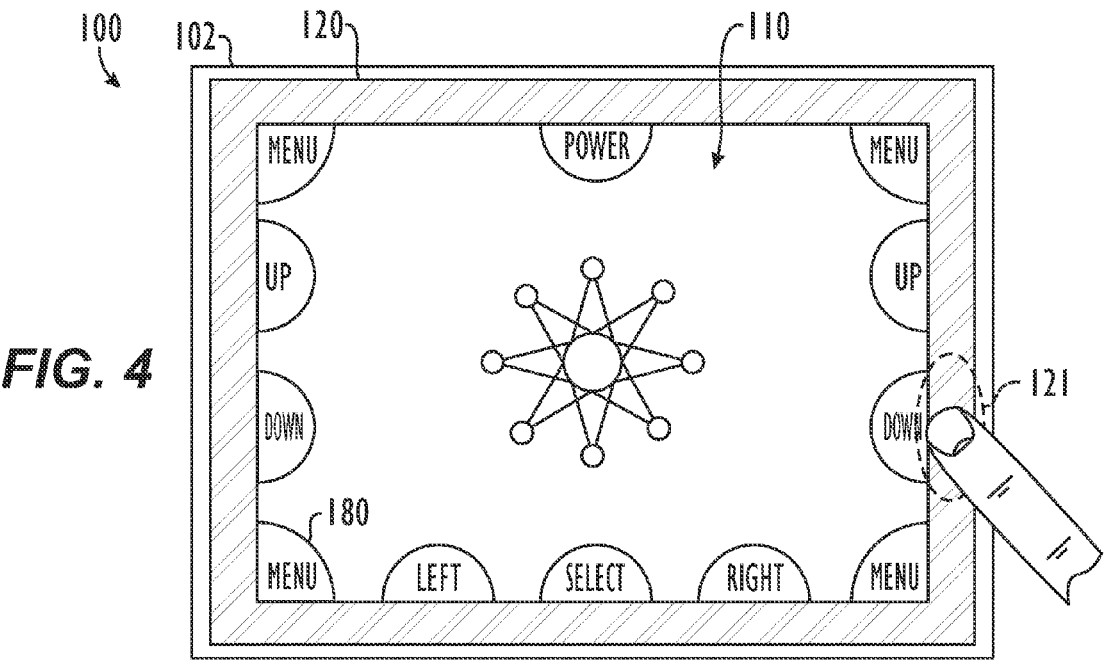
FIG. 4 illustrates an embodiment of an electronic device having a display and a touch sensitive bezel according to certain teachings of the present disclosure.

Having a display 60 that encompasses almost the entire front surface 54 of the housing 52 of the electronic device 50 has several advantages discussed herein. In addition, having one or more touch sensitive surfaces on various portions of the housing 52 that allow a user to control the electronic device 50 can also provide several advantages discussed herein. As alluded to above, one or more touch sensitive surfaces can be located on the bezel 55 (i.e., the portion of the front surface 54 of the housing 52 that surrounds the display 60). Turning then to FIG. 4, an embodiment of an electronic device 100 having a touch sensitive bezel 120 according to certain teachings of the present disclosure is illustrated. As will be discussed in more detail below, the touch sensitive bezel 120 is used for user interface and control of the electronic device 100 and is used in conjunction with a graphical user interface operating on the device 100.

The electronic device 100 includes a housing 102 and a display 110. The housing 102 holds the display 110, which can be any conventional display known and used in the art for electronic devices. Some common examples for the display 110 include a Liquid Crystal display (LCD), an electroluminescent display, and a touch screen display. The housing 102 also holds the touch sensitive bezel 120, which is positioned substantially around the perimeter of the display 110. (In the present embodiment, the bezel 120 is positioned entirely around the perimeter of the display 110 so that the bezel 120 essentially frames the display 110.) The housing 102 of the electronic device 100 also contains electronic components that provide a number of operations and features, such as memory access, communications, sound, power, etc. In addition, the electronic device 100 houses electronic components (discussed in more detail below) that are used to control operation of the display 110 and the bezel 120.

In one example, the electronic device 100 can be a picture frame having memory for storing digital pictures and for viewing on the display 110. In another example, the electronic device 100 can be a digital media device having the display 110, the touch sensitive bezel 120, and lacking most or all buttons or similar physical controls on the housing 52. In other examples, the electronic device 100 can be an electronic game, a personal digital assistant, a multimedia device, a cellular telephone, a portable video player, a portable navigation device, or the like.

The bezel 120 is touch sensitive and is used to obtain touch data from the user in response to touch events made by the user on the bezel 120. The electronic device 100 uses the touch data obtained with the bezel 120 to perform various operations and functions related to user interface and user control of the device 100. For example, the touch data obtained with the bezel 120 can control what is displayed with the device 100, what files are played, what the volume level is, what the settings for the display 110 are, etc.

A number of techniques can be used to obtain touch data with the touch sensitive bezel 120. In one embodiment, at least a portion of the bezel 120 includes a multi-touch input surface capable of generating touch data for a plurality of touch events made by the user simultaneously at different locations of the bezel 120. For example, the bezel 120 can include a capacitive sensor array and data acquisition circuitry for detecting when a user touches areas or locations on the bezel 120. The capacitive sensor array and data acquisition circuitry can be similar to those disclosed in U.S. patent application Ser. No. 10/949,060, filed Sep. 24, 2004 and entitled "Raw Data Track Pad Device and System," which is incorporated herein by reference in its entirety. An example of such an embodiment for the bezel 120 is discussed below with reference to FIGS. 5 and 6. During operation, the multi-touch input surface of the bezel 120 can be used to generate touch data that can be recognized as touch gestures discussed in more detail later.

In another embodiment, at least a portion of the bezel 120 includes a plurality of resistive or capacitive sensors and an integrated circuit for analyzing resistive or capacitive values caused by a user touching the bezel 120. An example of an embodiment for such a bezel 120 is discussed below with reference to FIGS. 13A and 13B. In yet another embodiment, at least a portion of the bezel 120 includes force detection layers as disclosed in U.S. patent application Ser. No. 11/278,080, filed Mar. 30, 2006 and entitled "Force Imaging Input Device and System," which is incorporated herein by reference in its entirety. An example of such an embodiment for the bezel 120 is discussed below with reference to FIG. 14.

During operation of the device 100, areas or locations of the bezel 120 are designated for various user controls of the device 100. In one embodiment, particular user controls designated for areas of the bezel 120 may be indicated directly on the bezel 120 itself using graphics, words, or the like. In such an embodiment, the user controls having indications directly on the bezel 120 may be fixed and may be those user controls that a user would typically use when operating the device 100 in any of the possible modes or functionalities of the device 100. In another embodiment, particular user controls designated for areas of the bezel 120 may not have any visual indications appearing directly on the bezel 120 itself. Instead, the designated user controls may be in a logical or predetermined location on the bezel 120 that the user may know or expect.

In yet another embodiment, the electronic device 100 has user interface software or an application for displaying icons, menu items, pictures, or words (referred to herein as "visual guides") 180 on the display 110. The visual guides 180 correspond to the user controls designated for areas or locations of the bezel 120 and are shown on the display 110 adjacent designated areas on the bezel 120. By way of example, the visual guides 180 in FIG. 4 include "Menu," "Power," "Left," "Select," "Right," etc. It will be appreciated that the visual guides 180 and their arrangement depicted in FIG. 4 are only exemplary. More or fewer visual guides 180 may be provided, and the size of the visual guides 180 can be larger or smaller than the scale depicted in FIG. 4.

As shown in FIG. 4, the visual guides 180 are preferably located near the perimeter of the display 110 so that the majority of the display 110 can be dedicated to showing content or the like. Preferably and as shown in FIG. 4, the visual guides 180 are superimposed over visual data (e.g., content, text, a picture, video, etc.) shown on the display 110. The visual guides 180 can be displayed consistently on the display 110 while the electronic device 100 is operating. Alternatively, the visual guides 180 may not be shown in most circumstances during operation and can be displayed only after the user touches a predetermined portion of the bezel 120 or makes some user configured preference, or moves the device 100.

During operation, the user can touch designated areas (e.g., outlined area-121) on the bezel 120 to initiate user controls for the electronic device 100. Some examples of possible user controls include menu operations, cursor operations, and data entry operations. The user interface software operating on the display 110 shows the visual guides 180 in positions adjacent the areas 121 on the bezel 120 designated to perform the user controls so the user may know the general area of the bezel 120 designated for the corresponding user control indicted by the adjacent visual guide 180. The designated areas 121 can be arbitrarily positioned and sized around the bezel 120 depending on the context or content of what is being displayed. The number of distinct areas 121 that can be designated depends on the size of the display 110 and the bezel 120 and depends on what type of touch sensitive sensors are used for the touch sensitive bezel 120. In one example, one edge of the bezel 120 that is about 4 to 5-inches in length may accommodate about one-hundred distinct areas that can be designated for user controls.

In a further embodiment, the electronic device 100 may be capable of rotation and may have an orientation sensor (discussed in more detail below) for determining the orientation of the device 100. Based on the sensed orientation, the areas 121 on the bezel 120 designated for the user controls can be altered or relocated to match the current orientation of the device 110. Likewise, the user interface software operating on the device 100 can alter the location of the visual guides 180 to match the current position of the areas 121 on the bezel 120 designated for the user controls.

Now that details related the electronic device 100, display 110, and bezel 120 for user interface and control have been discussed above in FIG. 4, we now turn to a more detailed discussion of components for an electronic device of the present disclosure.

Figure 5:
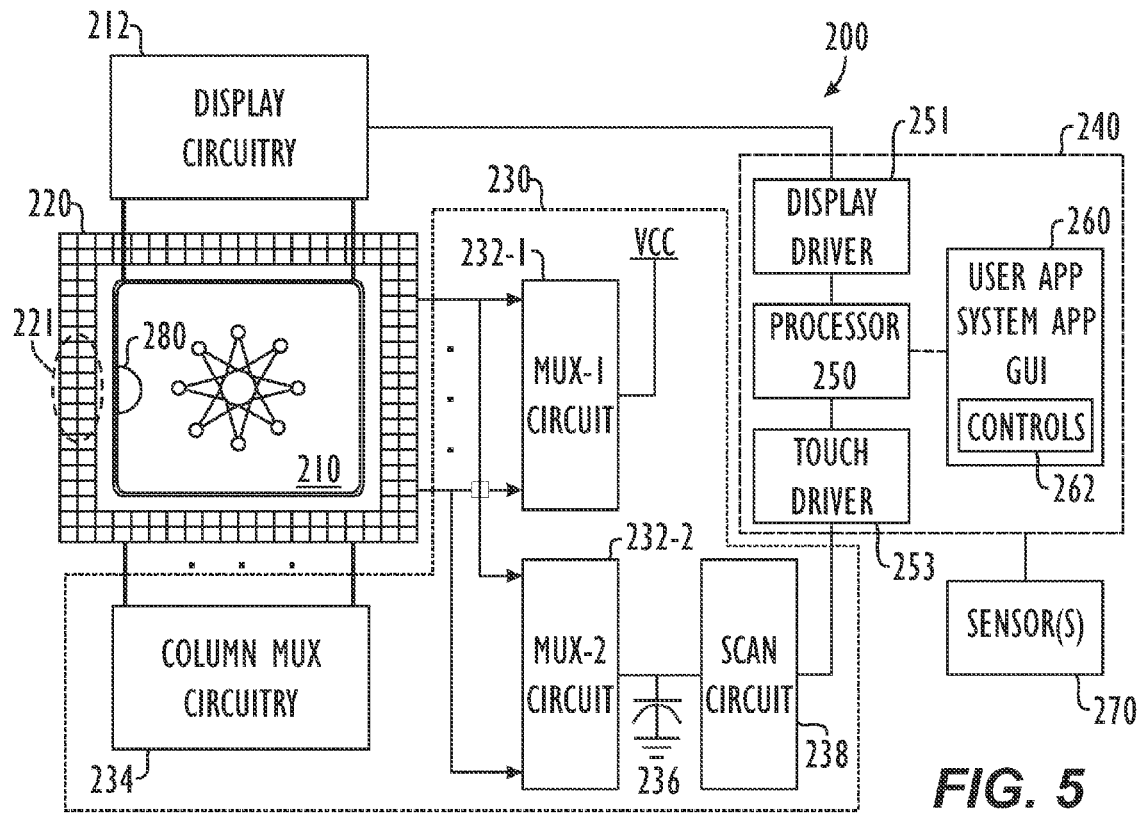
FIG. 5 schematically illustrates components of the electronic device of FIG. 4.

Referring to FIG. 5, components of an embodiment of an electronic device 200 according to certain teachings of the present disclosure are schematically illustrated. Some of the components of the electronic device 200 are not shown in FIG. 5 but will be apparent to one skilled in the art. For example, the electronic device 200 may include a housing and conventional components, such as power circuitry, a central processing unit, memory, and the like. In one example of a conventional component, for instance, the memory can store data, software, etc. and can include random access memory, read-only memory, or both.

The electronic device 200 includes a housing (not shown), a display 210, display circuitry 212, a capacitive sensor array 220, data acquisition circuitry 230, and processing circuitry 240. The display 210 is positioned on the housing (not shown) and has a perimeter. The capacitive sensor array 220 is also positioned on the housing (not shown) and is positioned substantially around the perimeter of the display 210 so that the capacitive sensor array 220 forms part of a bezel for the display 210. The data acquisition circuitry 230 is coupled to the capacitive sensor array 220 and is used to acquire touch data from the array 220. The processing circuitry 240 is coupled to the data acquisition circuitry 230 and to the display 210.

As will be explained in more detail below, the processing circuitry 240 is configured to obtain touch data from the data acquisition circuitry 230, determine if at least one user control is invoked by the obtained touch data, and initiate at least one operation for the electronic device 200 based on the determined user control. The processing circuitry 240 includes a processor 250 and includes one or more software/firmware components that operate on the processor 250. These components include a display driver 251, a sensor driver 253, and system and/or user applications 260.

The applications 260 have one or more user controls 262 that a user can invoke by touching one or more areas of the capacitive sensor array 220 in order to change or control operation of the electronic device 200. To determine which user control 262 is invoked, the processing circuitry 240 designates one or more areas 221 of the capacitive sensor array 220 for the one or more user controls 262 of the applications 260. Then, when a user touches one or more areas 221 of the capacitive sensor array 220, the data acquisition circuitry 230 provides touch data to the processing circuitry 240. The capacitive sensor array 220 and data acquisition circuitry 230 is preferably capable of generating touch data that describes more than one simultaneously touched areas 221 on the bezel 220 so that the touch data can cover instances when the user touches one area only, touches more than one area simultaneously, or makes a pattern or gesture of touches on the array 220.

In turn, the processing circuitry 240 compares the obtained touch data to the one or more designated areas and determines which of the user controls 262 has been invoked by the user. The comparison of obtained touch data to the designated areas 221 may involve different levels of processing. In one level of processing, the processing circuitry 240 compares the location (e.g., rows and columns) that the obtained touch data occurred on the array 220 to the designated areas 221 for the user controls. If the obtained touch data occurs in the designated area 221 for a satisfactory time period or over an average extent of the area 221, for example, then the processing circuitry 240 determines that the corresponding user control has been invoked.

In other levels of processing, the obtained touch data can include one or more locations (e.g., rows and columns) being touched on the array 220, can include touch data obtained over an interval of time, can include changes in touch data over time, and can include other "aggregate" forms of touch data. In this level of processing, the processing circuitry 240 recognizes "touch gestures" from the touch data and determines which control is invoked by the "touch gesture." Some examples of "touch gestures" include a single "tap" at a location of the array 220, two or more sequential taps made at substantially the same location of the array 220 within predefined intervals of one another, touch events occurring substantially simultaneously at two or more locations of the array 220, sliding touches of one or more fingers by the user over the surface of the array 220, sustained touch at one location of the array 220 in conjunction with sliding or tapping touches at other locations of the array 220, and other combinations of the above.

To recognize such "touch gestures," one or more areas 221 of the array 220 are associated with a control 262, and touch gestures involving one or more touches on those areas 221 are associated with the control 262. The touch gesture can be a single momentary tap, a sustained touch, two or more sequential taps, a sweep of a finger, and any other possible touch arrangement. To then determine if the control 262 has been invoked, the processing circuitry 240 determines if the touch data includes those areas 221 associated with the control 262 and determines from the touch data if the touch gesture associated with the control 262 has occurred on those areas 221.

Turning from discussion of the capacitive sensor array 220, the processing circuitry 240 is also operatively connected to the display 210 by display circuitry 212. The display driver 251 is used to configure visual data (e.g., content, screens, user interface elements, visual guides, etc.) and to send or present the visual data to the display circuitry 212. The electronic device 200 preferably presents one or more visual guides 280 along the perimeter of the display 210. In addition, the one or more visual guides 280 are preferably displayed at locations on the display 210 adjacent to corresponding areas 221 of the capacitive sensor array 220 designated for the one or more user controls 262 associated with the one or more visual guides 280.

Given the overview of the electronic device 200 discussed above, we now turn to a more detailed discussion of the components of the electronic device 200 of the present embodiment. The capacitive sensor array 220 includes a plurality of rows and columns of capacitive sensors, and the array 220 may or may not be symmetrical. The rows and columns of the array 220 are positioned around the perimeter of the display 210.

The data acquisition circuit 230 includes multiplexer ("MUX") circuitry coupled to the sensor array 220. In particular, two multiplexer circuits 232-1 and 232-2 (referred to as the MUX-1 and MUX-2 circuits) are coupled to the rows of the sensor array 220. Each row in the sensor array 220 can be electrically coupled to a reference voltage Vcc through the MUX-1 circuit 232-1 and can be electrically coupled to a storage capacitor 236 through the MUX-2 circuit 232-2. While not shown in detail, each column of sensor array 220 can be similarly coupled to a reference voltage Vcc and to a storage capacitor using column MUX circuits 234. Thus, a user touching a location or area 221 of the sensor array 220 can alter the capacitance measured at affected rows and columns of the array 220.

During operation, the MUX circuits 232 and 234 are responsible for coupling and stimulating successive elements of the sensor array 220 (e.g., rows, columns, or individual pixels—that is, an element at the intersection of a row and column) to the storage capacitor 236 in a controlled/sequenced manner and indicating that a measurement cycle has begun to the scan circuit 238. When the charge on storage capacitor 236 reaches a specified value or threshold, the scan circuit 238 records the time required to charge the storage capacitor 236 to the specified threshold. Consequently, the scan circuit 238 provides a digital value that is a direct indication of the capacitance of the selected element of the sensor array 220.

The sensor driver 240 obtains measured capacitance data from the acquisition circuitry 230. In turn, the sensor driver 240 processes the measured capacitance data and configures a corresponding control, command, operation, or other function designated by the row and column location of the capacitance data. Depending on what application, content, or the like is currently operating, the system application 260 and/or user application 262 implements the corresponding user control 262. Implementation may affect what is currently being displayed on the display 210. Consequently, the display driver 214 may operate the display circuitry 212 coupled to the display 210 in response to an implemented control 262. For example, a new menu may be presented on the display 210 in response to an implemented user control 262.

As shown in FIG. 5, the electronic device 200 can also include one or more sensors 270 coupled to the processing circuitry 240. The one or more sensors 270 can include a Mercury switch, an acceleration sensor, inclinometer sensor, an electronic compass, a light sensor, a motion sensor, or an orientation sensor. In one embodiment, the orientation sensor 270 is a 3-G accelerometer similar to what is used in gyro remotes or used in hard drives to detect free fall. The accelerometer 270 detects gravity and generates orientation data that can indicate which edge of the display 210 is "up," "down," "north," or other direction. The processing circuitry 240 coupled to the accelerometer 270 determine the orientation of the electronic device 200 from the orientation data obtained from the sensor 270. The determined orientation can then be used to designate or alter the location of the areas 221 on the array 220 to mach the orientation of the device 200. In addition, the determined orientation can then be used to designate or alter the location of the visual guides 280 on the display 210 to mach the newly designated areas 221 on the array 220. Furthermore, the determined orientation can then be used to rotate or flip the content shown on the display 210 to match the orientation of the device 200. Details related to how the electronic device 200 can use orientation data are discussed below with reference to FIGS. 8 and 9A-9B.

In another embodiment, the one or more sensors 270 can include one or more ambient light sensors for detecting the level of ambient light around the device 200. Preferably, the device 200 includes at least two such ambient light sensors 270 for redundancy. Based on the level of ambient light detected, the electronic device 200 can automatically adjust the contrast and/or brightness of the display 210 accordingly. In yet another embodiment, the one or more sensors 270 can include a motion sensor, such as a passive pyroelectric sensor. The motion sensor 270 can be used to detect motion of the electronic device 200 from a stationary state so that the device 200 can "wake up" (e.g., turn on or come out of a standby mode) or can show previously hidden visual guides 280 on the display 210 in response to being moved.

Referring to FIG. 6, a process 300 of operating the electronic device having the capacitive sensor array 220 of FIG. 5 for the touch sensitive bezel is illustrated in flow chart form. For better understanding, element numerals for components of FIG. 5 are concurrently provided in the discussion that follows. During operation, the MUX-1 circuitry 232-1 couples a first row of the sensor array 220 to the reference voltage Vcc for a specified period of time (Block 302) and then isolates or disconnects that row from Vcc (Block 304). Next, the MUX-2 circuitry 232-2 couples the same row to the storage capacitor 236 for a specified period of time, or until the voltage on storage capacitor 236 reaches a specified threshold (Block 306).

While the MUX-2 circuitry 232-2 couples the selected sensor row to the storage capacitor 236, a determination is made whether the storage capacitor's voltage reaches a specified threshold (Block 308). If so (i.e., the "Yes" prong of Block 308), the digital value corresponding to the time it took to charge the storage capacitor 236 to the specified threshold is recorded by the scan circuit 238 (Block 310). If the storage capacitor's voltage does not reach the specified threshold during the time that the MUX-2 circuitry 232-2 couples the selected sensor row to the storage capacitor 236 (i.e., the "No" prong of Block 308), then the acts of block 302-308 are repeated.

Once a digital value corresponding to the capacitance of the selected row has been obtained (Block 310), a check is made to see if there are additional rows in the sensor array 220 that need to be sampled. If more rows need to be sampled, the process 300 goes to the next row at Block 314 and repeats the acts of Blocks 302-308. If it is determined at Block 312 that all the rows in the sensor array 220 have been sampled in accordance with Blocks 302-308, a similar sampling process is used to acquire a capacitance value for each column in the sensor array 220 (Block 316). Once all rows and all columns have been processed, the entire process 300 is repeated, which can be done at a predetermined interval (Block 318).

Referring to FIG. 7, a process 400 of operating the electronic device of FIG. 5 is illustrated in flow chart form. For better understanding, element numerals for components of FIG. 5 are concurrently provided in the discussion that follows. During operation, areas 221 on the array 220 of the touch sensitive bezel are designated for user controls of the electronic device (Block 402). In designating an area 221, contiguous rows and columns of a portion of the capacitive sensor array 220 are associated with a user control for the electronic device 200. The electronic device 200 also generates visual guides 280 for the user controls (Block 404) and displays the visual guides 280 on the display 210 adjacent the designated areas 221 on the touch sensitive bezel 220 to which the visual guides 280 correspond (Block 406). For example, the visual guides 280 are preferably displayed along the perimeter of the display 210 adjacent corresponding rows and columns of the capacitive sensor array 220 associated with the user controls for the electronic device 200. In this way, the majority of the display 210 can be used to show content.

The electronic device 200 then obtains touch data with the capacitive sensor array 220 using the techniques disclosed herein (Block 408). The touch data in a basic form includes information of which rows and columns of the capacitive sensor array 220 have been touched (i.e., have exceeded the capacitance threshold). The electronic device 200 performs various forms of processing of the obtained touch data. For example, the touch data can be processed to determine how long the rows and columns have reached a threshold capacitance, to determine how long rows and columns have been below the threshold capacitance since an initial period of being above the threshold, and to determine other forms of information. Furthermore, to facilitate processing, the touch data can be aggregated together into predefined intervals of time and portions of the array 220. In addition, the touch data obtained at a first instance can be stored and later compared to touch data obtained at a subsequent instance to determine changes in the data overtime, caused by a user's touch movement on the array 220, for example. These and other forms of processing of the touch data will be apparent to one skilled in the art with the benefit of the present disclosure.

After the touch data has preferably been processed with the techniques described briefly above, the electronic device 200 then compares the information from the touch data to the designations on the array 220 associated with the user controls for the device 200 (Block 410). From the comparison, the electronic device 200 determines which user control is invoked by the designated area 221 of the array 220 that the user has touched (Block 412). Then, the electronic device 200 initiates the determined user control to affect processing of the device 200 (Block 414). Once the user control is implemented, it may be necessary to update the display 210 and the designated user controls (Block 416). If the same visual guides 280 and designated user controls can be used, then the process returns to Block 408, for example, to obtain any new touch data with the array 220. If, however, new visual guides 280 and designated user controls are needed due to a change in the content of what is displayed or the context of the device's operation, then the process returns to Block 402 to designate new areas on the array 220 for user controls and proceeds to subsequent steps.

One skilled in the art will appreciate that the touch sensitive array 220 around the perimeter of the display 210 of the device 200 can be used to implement various user controls in some ways similar to how a conventional touch pad is used. In a brief example, the information at Block 410 may indicate a "tap" made by the user on the array 220. This "tap" (i.e., a touch by a finger on the array 220 for a "short" duration of time) may have been performed in designated area 221 of the array 220. The electronic device 200 determines that the area 221 invoked by the "tap" is designated for performing a "page up" control of what is being displayed on the device 200. The time duration of the "tap" may indicate the amount or extent of the "page up" control. In response to the user control, the electronic device 200 causes what is being shown on the display 210 to page up as requested by the user.

As noted briefly above, the electronic device 200 of FIG. 5 can include one or more sensors 270, which can include an accelerometer or other orientation sensor Referring to FIG. 8, a process 430 of operating the electronic device of FIG. 5 having the orientation sensor 270 is illustrated in flow chart form. For better understanding, element numerals for components of FIG. 5 are concurrently provided in the discussion that follows. Initially, the electronic device 200 obtains orientation data from the sensor 270 (Block 432). The electronic device 200 can obtain the orientation data at periodic intervals or at certain points during operation. The electronic device 200 then determines whether the orientation of the device has changed (Block 434). If not, the process 500 can end.

If the orientation has changed at Block 434, the electronic device 200 determines how the orientation has changed and alters the designation of areas for user controls of the touch bezel (Block 436). In particular, the processing circuitry 240 alters how the one or more areas 221 of the capacitive sensor array 220 are designated for the one or more user controls 262 so that the designation better matches the new orientation of the device 200. In addition, if the display 210 is showing visual guides 280 for the corresponding areas 221 of the bezel 220, then the electronic device 200 also alters location of the visual guides 280 on the display 210 so that they match the newly designated area 221 for the user controls on the array 220 (Block 438). Then, the process 430 can end until called again during the operation of the electronic device 200.

By way of example, FIG. 9A shows an electronic device 450 having content on the display 460. The device 450 is rectangular and can be oriented in either a "portrait" or a "landscape" orientation. Accordingly, the display 460 can show a picture or other content in either orientation. In some circumstances, the orientation of what is displayed may not match how the device 450 is currently orientated. The user may rotate or changes the orientation of the device 450, for example, to the orientation shown in FIG. 9B. The orientation senor 490 is used to determine the new orientation (i.e., rotation of 90-degrees), and the processing circuitry (not shown) of the device 450 determines that the areas 471 designated on the bezel 470 for certain user controls of the electronic device 450 should be changed. Accordingly, the processing circuitry alters the designation of the areas 471 of the bezel 470 so that they will better match the newly sensed orientation of the device 450. In addition, because the electronic device 450 can display visual guides 480 relative to the designated areas 471 of the bezel 470, the processing circuitry also alters location of the visual guides 480 on the display 460 so that their new locations match the new locations of the designated areas 471 of the bezel 470.

For example, the area 471A of where the "Left" control 480 in FIG. 9A will remain on the same side 454 of the device 450 as shown in FIG. 9B. Yet, the "Left" control 480 is preferably orientated along the new bottom edge 456 of the device 450 so that it is in a position more amenable to the user. Thus, the old area 471A is no longer designated for the "Left" control. Instead, a new area 421B of the bezel 470 is designated for the "Left" control 480, and the visual guide 480 for the "Left" control is displayed in the appropriate position of the display 470 along the new bottom edge 456 to match the new designated area 471B.

In the example of FIGS. 9A-9B, orientation data from the orientation sensor 490 is used to alter the designation of the areas 471 for the user controls and the location of visual guides 480. In other embodiments, the orientation of the content to be displayed may dictate how the designation of the areas 471 for the user controls and the location of visual guides 480 should be for the device 450. For example, the display 460 of the electronic device 450 in FIGS. 9A-9B is rectangular and can be used to show content in "portrait" or "landscape" orientations. Depending then on the desired or required orientation for particular content (e.g., image, screen, user interface, or picture) to be shown on the display 460, the electronic device 450 can alter the designation of the areas 471 for the user controls and the location of visual guides 480 according to the "portrait" or "landscape" orientations of the content. In other words, when the device 450 is preparing to display particular content, the electronic device 450 can determine the particular orientation for that content. Then, when the device 450 switches to show that new content on the display 460, the electronic device 450 alters the designation of the areas 471 for the user controls and the location of visual guides 480 if the orientation of the newly displayed content is different from that previously displayed. Thus, the user can naturally rotate the device 450 to better view the newly displayed content in its preferred orientation (e.g., "portrait" or "landscape"), and the visual guides 480 and designated areas 471 will be already matched to the content's orientation.

Turning to FIG. 10, the electronic device 500 of the present disclosure can also be configured to discriminate or ignore certain forms of touch data made on the bezel 520. For example, the housing 502 of the electronic device 500 may be designed to fit mainly around the display 510 and the surrounding bezel 520. As a result, when a user holds the electronic device 500, it may be likely that portion of the user's hand (e.g., one of the user's fingers or thumb) will maintain consistent contact on portion 522 of the bezel 520. In this instance, it is desirable that the electronic device 500 ignores such consistent contact made on the bezel 520. The processing circuitry (not shown) of the device 500 can store information tracking how long touch data has occurred on portions of the bezel 520 and/or how many adjacent, designated areas have had repeated touch data. Then, after a predefined time limit, the processing circuitry can begin to ignore that consistent touch data in the portion 522 of the bezel 520 when determining what user controls the user is implicating. Furthermore, the processing circuitry can designated new locations for areas of the bezel 520 for user controls that are part of the ignored portion 522 of the bezel 520. In the present example, the areas 524 and 526 for the "page up" and page down" user controls on the left side of the bezel 520 have been moved to new locations outside the ignored portion 522. Likewise, the visual guides 512 associated with the "page up" and page down" user controls have been shifted to new locations adjacent to the newly designated areas 524 and 526.

In previous embodiments of the present disclosure, the touch sensitive bezel of the present disclosure is arranged substantially around the entire perimeter of the display. In one alternative shown in FIG. 11, an embodiment of an electronic device 530 can have a touch sensitive bezel 550 around a display 540 just as before. In addition, the electronic device 530 can have one or more additional touch sensitive pads or surfaces 560 incorporated throughout various sides of the housing 532 for the device 530. These additional touch sensitive pads 560 can be used to detect location caused by a user touching the pads 560 and/or can be used to detect force caused by a user pressing the pads 560. The additional touch sensitive pads 560 can be positioned along edges of the housing 532 and can be positioned on the back of the housing 530.

Any user controls designated for areas 562 on these additional touch sensitive pads 560 may be preconfigured and may not be change during operation. In this way, the user may know the functionality of the various pads 560 and can use the areas 562 to control features of the device 530 without the need of any visual guides 542 on the display 540. Alternatively, the user may be able to designate any user controls for these additional touch sensitive pads 560 using setup and configuration operations of the device 530. In yet another alternative, user controls for areas 562 of these additional pads 560 can be designated and re-designated by the electronic device 530 during operation in much the same way disclosed herein for areas 552 on the bezel 550. For example, areas 562 on the pads 560 can be designated for user controls similar to the areas 552 that can be designated on the bezel 550, and visual guides 542 can be displayed around the perimeter of the display 540 adjacent to corresponding areas 562 on the additional pads 560 in the same way that the visual guides 542 are displayed adjacent designated areas 552 of the bezel 550.

In FIG. 11, for example, the area 552 on the bezel 550 can be designated to adjust values, and the areas 562 of the adjacent side pad 560 can be designated to select various attributes of the display 540. Because the device 530 can be hand-held, the user can selected from the various attributes by touching an area 562 on the side pad 560 with the hand used to hold the device 530, and the user can then adjust the value for the selected attribute by touching the area 552 on the bezel 550 with a finger of the other hand. The side pad 560 can be either a large surface for tracking touch inputs or can includes a plurality of small dedicated surfaces, such as touch buttons, for performing dedicated functions. In yet an another alternative, the additional pads 560 can also be force sensitive so that a predetermined amount of force or pressure caused by a user touch is required to invoke the user control associated with the touched areas 562 of the pads 560.

In additional alternatives shown in FIG. 12, a touch sensitive bezel 590 according to the present disclosure can be arranged in a housing 572 around at least a portion of a display 580 of an electronic device 570. In general, the bezel 590 can include one or more discrete touch sensitive surfaces positioned in the housing 572 adjacent one or more sides of the display 580. On device 570A, for example, the bezel 590 has a plurality of discrete touch sensitive surfaces positioned in the housing 572 adjacent each side of the display 580. On device 570B, for example, the bezel 590 has a first touch sensitive surface positioned in the housing 572 adjacent three sides of the display 580 and has a second touch sensitive surfaces positioned in the housing 572 adjacent one side of the display 580. On device 570C, for example, the bezel 590 has a first and second touch sensitive surfaces positioned in the housing 572 adjacent opposing sides of the display 580. These and other alternative arrangements are possible for touch sensitive bezels according to the present disclosure.

Figure 13A:
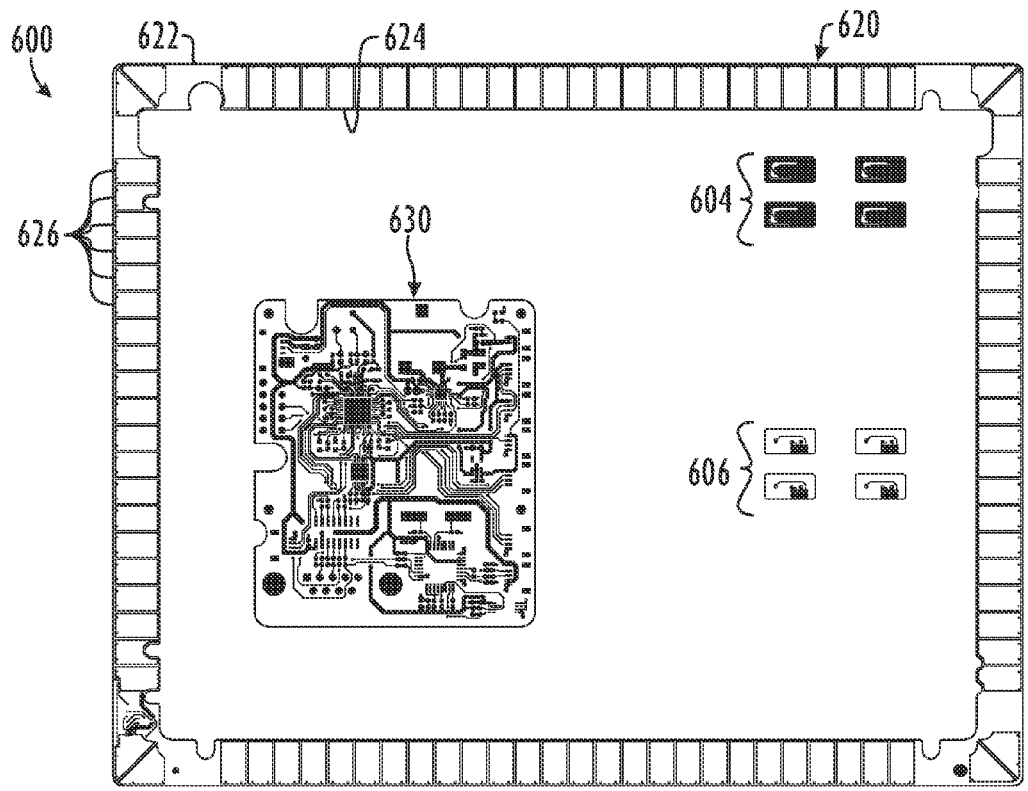
FIG. 13A illustrates an embodiment of a touch sensitive bezel having a plurality of conductive pads, a control module, and sensors according to certain teachings of the present disclosure.

In the embodiment of FIG. 5, the touch sensitive bezel of electronic device 200 has been described as having capacitive sensor array 220 that is used with data acquisition circuitry 230. As alluded to above, however, a touch sensitive bezel for an electronic device according to the present disclosure can include other forms of touch sensitive circuitry. Referring to FIG. 13A, another embodiment of a touch sensitive bezel 620 for an electronic device 600 is illustrated. Only portion of the touch sensitive bezel 620 is illustrated in FIG. 13A, and the housing, display, and other components of the electronic device 600 are not shown for illustrative purposes. In the present embodiment, the touch sensitive bezel 620 includes a Printed Circuit Board (PCB) 622 formed into a ring or frame shape and defining an inner opening 624 in which components of the display (not shown) for the electronic device are positioned. A plurality of conductive pads 626 are formed on the PCB 622, and each pad 626 is interconnected by a resistive element (not shown) according to details discussed below. The PCB 622 in this embodiment can have dimensions of approximately 8 by 10-inches and can have about 100 pads 626 formed around its perimeter.

The touch sensitive bezel 620 also includes a control module 630, which is housed in the electronic device and is shown here relative to the PCB 622 for illustrative purposes. The control module 630 is connected to the pads 626 of the PCB 622 by connections (not shown). The control module 630 has a plurality of components, including an infrared sensor, communication circuitry, accelerometer/inclinometer sensor, and other components. A suitable infrared sensor is an RE200B pyroelectric passive infrared sensor. A suitable accelerometer/inclinometer sensor is a KXP84 IC.

The electronic device 600 can also have a plurality of ambient light sensors 604 and a plurality of infrared (IR) modules 606, which are also shown here relative to the control module 630 for illustrative purposes. A suitable ambient light sensor is an ISL29001 light-to-digital sensor. The ambient light sensors 604 can be positioned in various locations on the housing of the electronic device and behind the display. The ambient light sensors 604 detect the level of ambient light near the display so that the electronic device can adjust the contrast, brightness, or backlighting of the display accordingly.

Figure 13B:
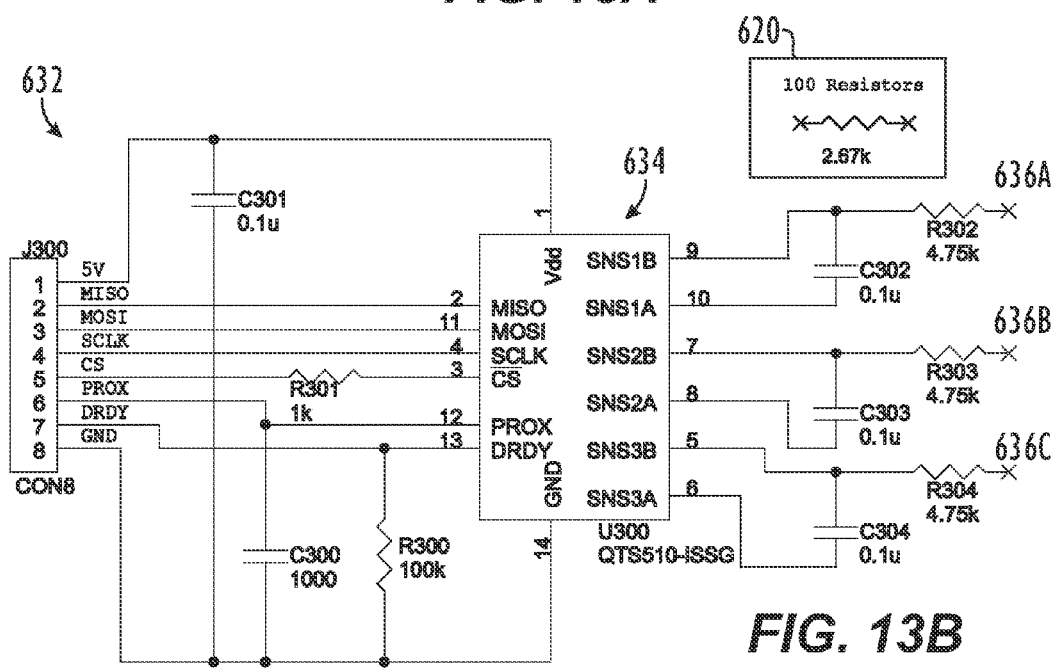
FIG. 13B illustrates a circuit diagram of portion of the control module for the touch sensitive bezel of FIG. 13A.

In FIG. 13B, a schematic diagram of components 632 comprising portion of the control module 630 of FIG. 13A is illustrated. The components 632 in this portion include a QT510 Interacted Circuit 634 available from Quantum Research Group, Ltd. The QT510 IC 634 is connected at three approximately equidistant points 636A, B, and C on the pad element 620, which is shown here schematically. Operation and arrangement of QT510 IC 634 and the pad element 620 is similar to that used for the QWheel™ available from Quantum Research Group, Ltd. However, in at least one exception, the QWheel™ has 18 pads formed into a concentric wheel with resistors of about 15K positioned between each pad and a total resistance of about 270k. In contrast, the present embodiment of the pad element 620 has about 100 pads formed as a frame for the display of the device. The 100 pads are interconnected by about 100 resistors. Each resistor has a resistance of about 2.67k so that the pad element 620 has a total resistance of about 270k.

In an additional embodiment, the operation and arrangement of IC 634 and the pad element 620 of the present disclosure can use techniques disclosed in U.S. Patent Application Publication No. 2006/0032680, entitled "A Method of Increasing Spatial Resolution of Touch Sensitive Devices," which is incorporated herein by reference in its entirety, to expand the detected sensitivity of the pad element 620.

Figure 13C:
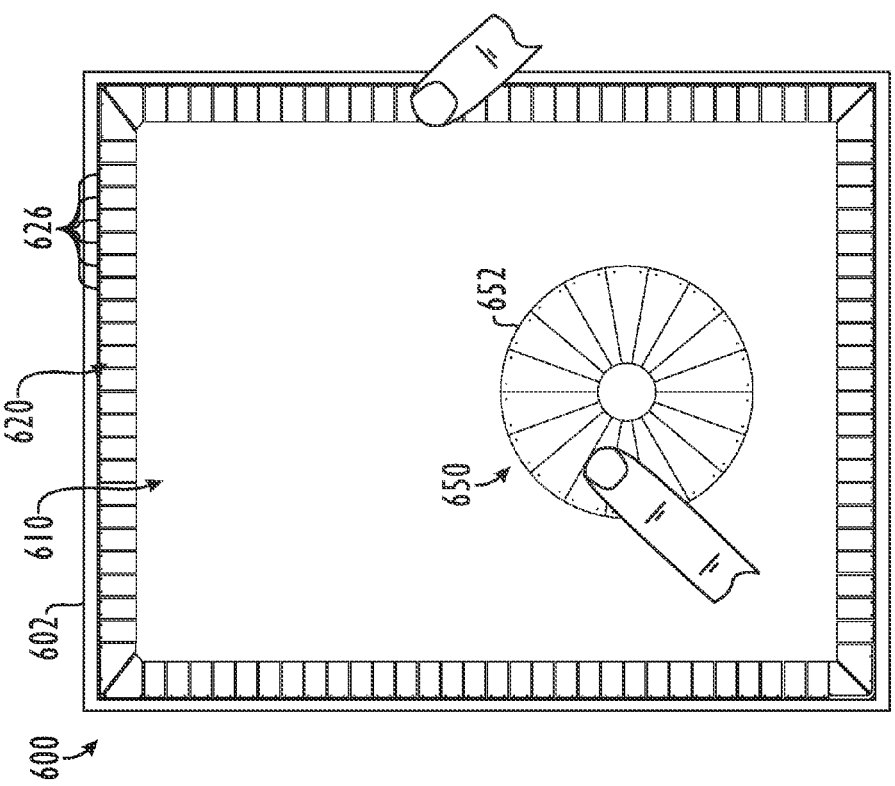

In the embodiment shown in FIG. 13A, the pads 626 are formed on PCB 622. In an alternative embodiment shown in FIG. 13C, pads 628 can be formed as layers on a surface of a display 610 for the electronic device 600. For example, techniques associated with Indium oxide doped with tin oxide (referred to herein as ITO techniques) can be used to deposit the pads 626 as transparent conductive thin layers on the surface of the display 620. In this way, the touch sensitive bezel of the device 600 is essentially the perimeter of the display 610, and the housing 602 is practically consumed by the display 610. In addition, a touch sensitive wheel 650 having a plurality of pads 652 can also be deposited as on the display 610 using ITO techniques to provide additional user controls of the electronic device 600.

Figure 14:
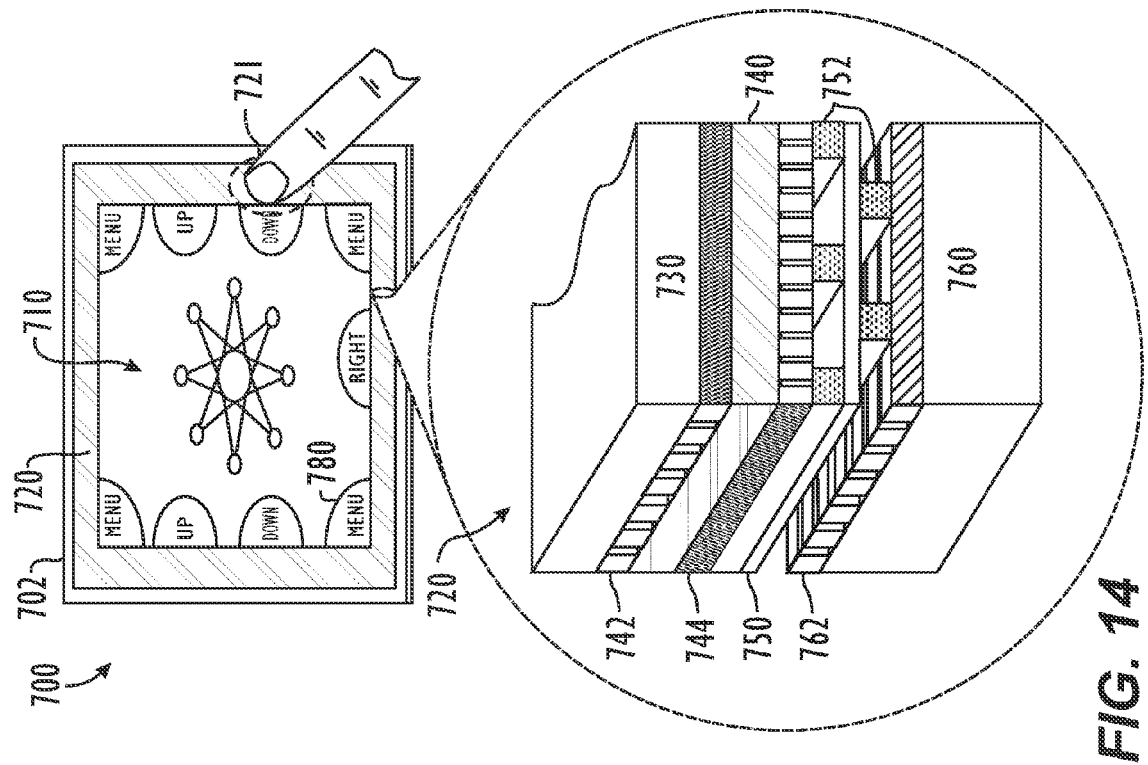
FIG. 14 illustrates an embodiment of a touch sensitive bezel having force detection and location layers according to certain teachings of the present disclosure.

In FIG. 14, an embodiment of an electronic device 700 having a touch sensitive bezel 720 capable of force and location detection is illustrated. Portion of the touch sensitive bezel 720 is illustrated in a detailed cutaway. In this embodiment, the bezel 720 includes a force detector combined with a location detector so that the bezel 720 can provide both location and force detection. The bezel 720 includes a cosmetic layer 730, a substrate 740, a dielectric spring layer 750, and a base or support layer 760. The substrate 740 has a plurality of conductive drive paths 742 on a "top" side and has a plurality of conductive sense paths 744 on the "bottom" side. The dielectric spring layer 750 has alternating, or spatially offset, raised structures 752 on both sides of the layer 750. The base layer 760 has a plurality of conductive drive paths 762. The drive paths 742 on the substrate 742 are laid down in a first direction to form rows as are the drive paths 762 on the base layer 760. The sense paths 744 on the bottom side of the substrate 740 are laid down in a second direction to form columns.

To sense location, the device 700 uses many of the same techniques discussed above with reference to the capacitive sensor array of FIG. 5. During operation, for example, data acquisition circuitry (not shown) of the device 700 drives the plurality of drive paths 742 (one at a time) during a first time period. During this same time period, the sense paths 744 on the other side of the substrate 740 are interrogated to obtain data representing the location of one or more touches to the cosmetic layer 730. For example, a user's finger placed in proximity to various rows and columns of the drive paths 742 and sense paths 744 on the top and bottom of the substrate 740 alters their capacitive relationship when processed by the data acquisition circuitry.

To sense force, circuitry of the device 700 drives the drive paths 762 on the base layer 760 (one at a time) during a second time period. During this same time, the sense paths 744 on the bottom side of the substrate 740 are again interrogated to obtain data representing the strength or intensity of force applied to cosmetic layer 730 by a user's touch. For example, when a force is applied by a user's finger on the cosmetic layer 730, the spring layer 750 deforms moving the sense paths 744 on the bottom of the substrate 740 closer to the drive paths 762 on the top of the base layer 760. A resulting change in mutual capacitance is then used to generate data indicative of the strength or intensity of an applied force. Additional details related to the layers and other aspects of this embodiment are disclosed in incorporated U.S. patent application Ser. No. 11/278,080.

Using force and location detection, the bezel 720 of the present embodiment can provide additional user interface and controls. For example, a user's finger in FIG. 7 is shown touching an area 721 of the bezel 720 designated for a "page down" operation (as indicated by the adjacent visual guide 780). The electronic device 700 uses the sensed location on the bezel 720 to determine which control is invoked by the user's touch. In addition, the force applied by the user's touch is obtained using the force detection features of the bezel 700. The sensed force can be used to determine the desired speed or extent with which to perform the "page down" operations, for example.

Given all of the previous discussion of the present disclosure, we now turn to an embodiment of an electronic device that incorporates one or more of the aspects and features discussed above. In FIGS. 15 through 19, an embodiment of a multimedia device 800 having a housing 802, a display 810, a touch sensitive bezel 820, and a user interface 900 according to certain teachings of the present disclosure is illustrated in a number of stages of operation and use. The multimedia device 800 in FIGS. 15 through 19 is meant to be exemplary. It will be appreciated that the user interface 900, available features and functions, user controls, screens, designations of the bezel 820, and various other details provided in the discussion that follows may be altered depending on the implementation and desired results.

In FIG. 15, a menu screen of the user interface 900 is displayed and lists various functions or features 902 (e.g., Music, Photos, Videos, etc.) that are available on the device 800. An area 822 of the bezel 820 adjacent a battery symbol 906 can be touched at any point during operation to access power settings for the device 800 without the user having to access the settings function 902 on the menu screen 900. A plurality of areas 824 on one side of the bezel 820 are designated for selection of one of the available functions or features 902, and visual guides 904 are provided on the perimeter of the bezel 820 adjacent the designated areas 824. A user touching one of these areas 824 of the bezel 820 accesses a subsequent screen of the user interface 900 for the selected function or feature 902. It should be noted that the side of the housing 802 may include a touch sensitive pad (similar to pads 560 of FIG. 11) on a side of the housing 802, and areas (e.g., areas 562 of FIG. 11) of this side pad can be similarly designated.

In FIG. 16, the user has accessed the photo feature from the previous menu so that the display 810 shows a photo screen 910 listing various available photos 912. An area 826 on the left side of the bezel 820 is designated for scrolling up and down the list of photos 912, and a visual scroll guide 916 is provided at the perimeter of the display 810 adjacent the area 826. A plurality of areas 828 on the right side of the bezel 820 are designated for selecting to open a selected photo 912, and visual guides 914 for each photo 912 are provided adjacent these areas 828. An area 830 in the upper corner adjacent a close window icon 914 on the screen 910 is designated on the bezel 820 for closing the current screen 910 to return to the menu screen of FIG. 15.

Figure 17A:
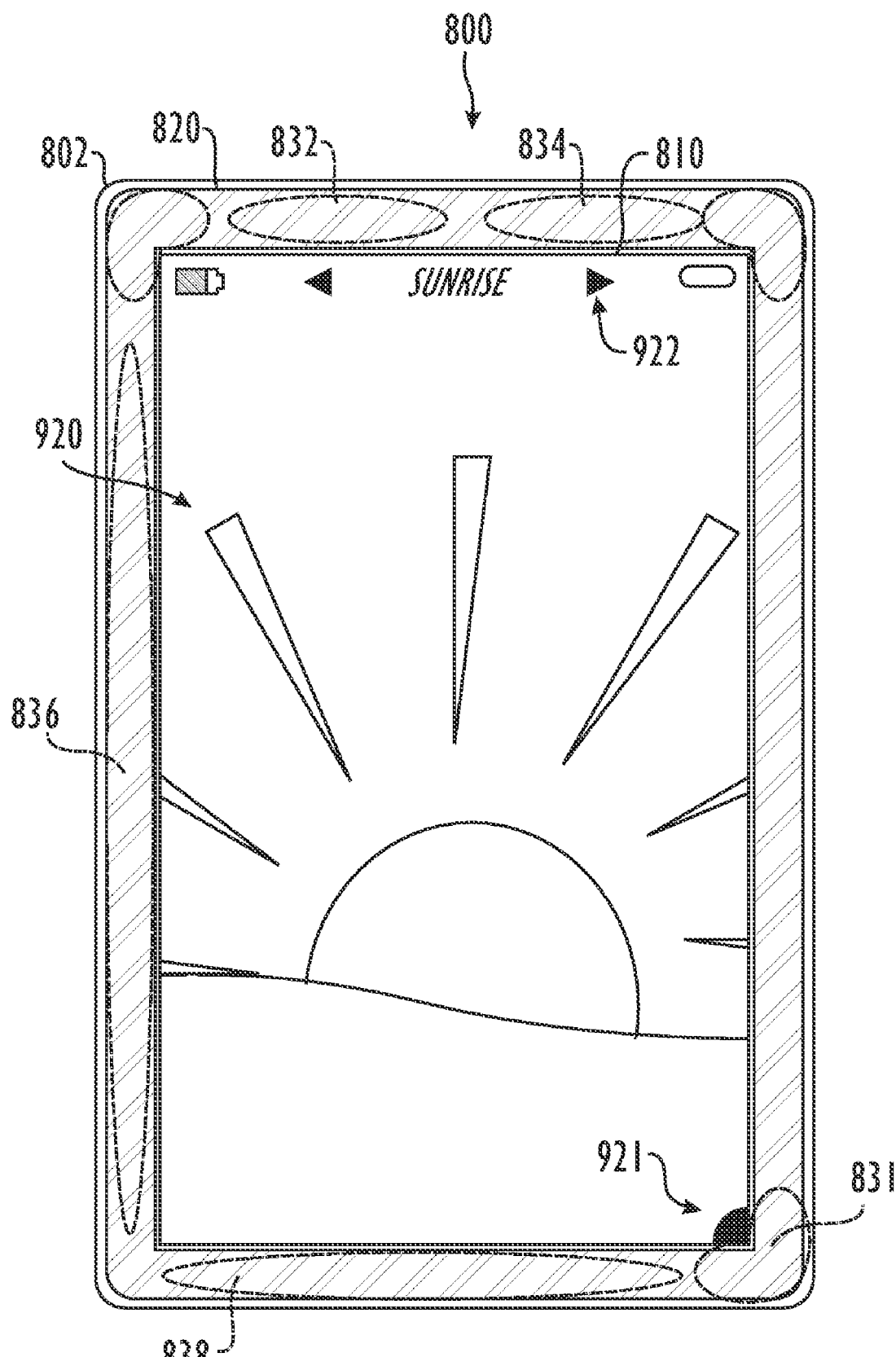

In FIG. 17A, the display 810 shows a screen 920 having a selected photo (e.g., sunrise). A toggle area 831 of the bezel 830 in the lower right corner is designated to access and display additional user controls that are discussed below with reference to FIG. 17C. A visual guide 921 is provided on the display 810 adjacent this toggle area 831. A first area 832 on the bezel 820 is designated for moving to a previous photo of those available, and a second area 834 is designated for moving to a subsequent photo. Corresponding visual guides 922 are displayed adjacent these areas 832 and 834 on the bezel 820. Additional areas 836 and 838 on adjacent sides of the bezel 820 may be designated for any of a number of operations, such as zoom, contrast, brightness, page down, scroll, etc. In the present embodiment, visual guides are not shown adjacent these areas 836 and 838 so that the majority of the display 810 is unobstructed with elements of the user interface, and the screen 920 can primarily display the content (i.e., the sunrise photo). The user controls for which these areas 836 and 838 are designated may be already known or readily apparent to the user.

Figure 17B:
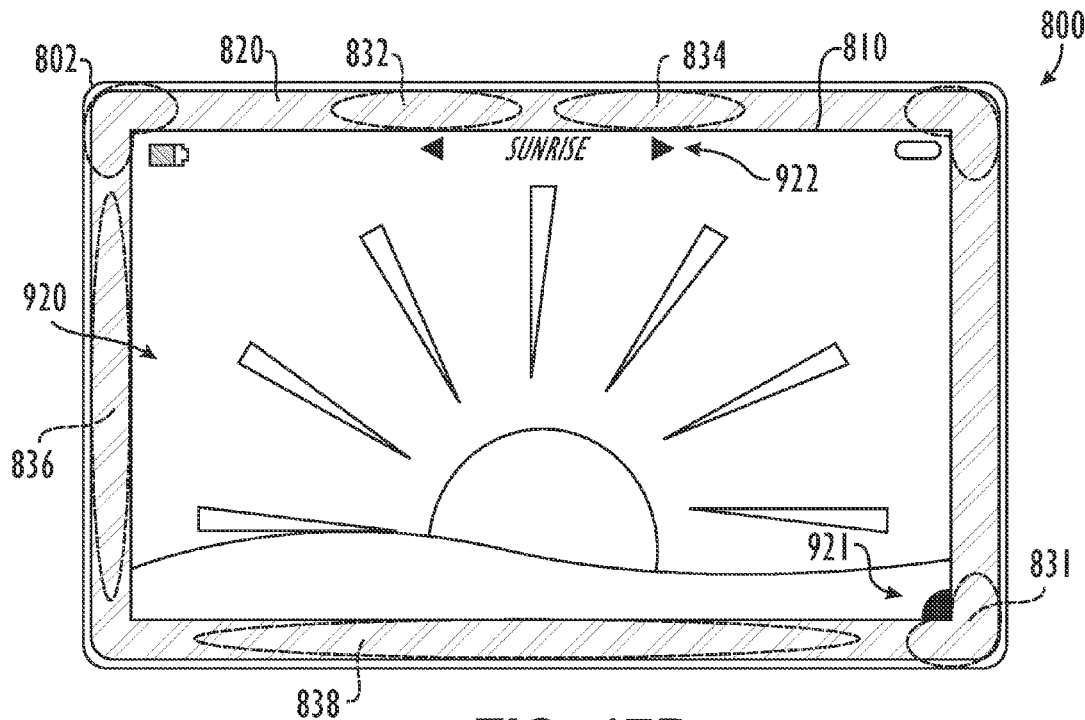

As shown in FIG. 17A, the device 800 is rectangular and is shown in a vertical (i.e., "portrait") orientation. The user may rotate the device 800 so that it has a horizontal (i.e., "landscape") orientation, such as shown in FIG. 17B. As discussed previously, the device 800 can have an orientation sensor (not shown), such as an accelerometer or an inclinometer, and can determine the orientation of the device 800. In FIG. 17B, the device 800 has determined the horizontal or landscape orientation. Based on this determination, the device 800 has adjusted the orientation of the screen 920 showing the photo on the display 810 in a landscape orientation and has readjusted the location of all the areas on the bezel 820 designated for the various user controls.

Figure 17C:
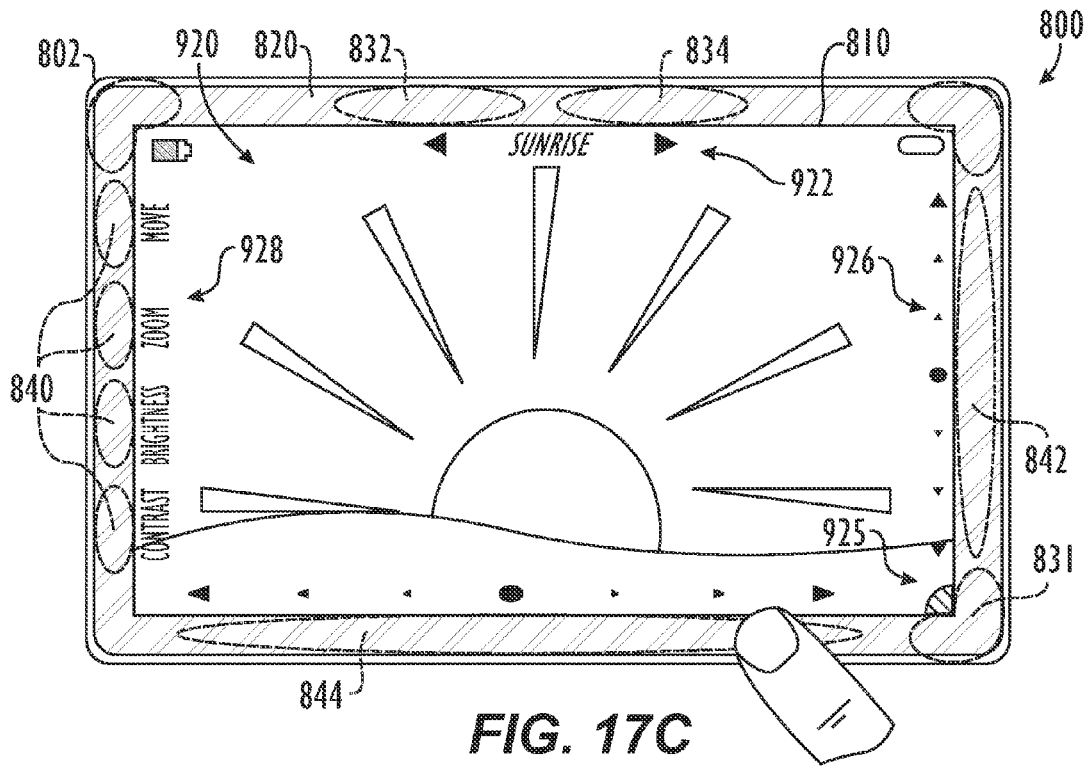

If the user selects the toggle area 831 in the lower right corner, the screen 920 shows additional user controls. In FIG. 17C, for example, the toggle area 831 has been previously selected so that a new visual guide 925 is provided adjacent the area. In addition, a plurality of areas 840 on the bezel 820 are designated for a number of user controls, which have visual guides 928 shown on the display 810 adjacent the bezel 820. In this example, the user controls available for viewing photos include contrast, brightness, zoom, and move. A user can select on of these areas 840 to access that corresponding control. Then, while the corresponding control is activated (either by highlighting the corresponding visual guide 928 or while the user continues touching the corresponding area 840), the user can adjust values or settings for the selected control using one or more areas 842 and 844 on other portions of the bezel 820. These areas 842 and 844 have adjacent visual guides 926 showing that they are used to adjust values. By reselecting the toggle area 831 in the lower right hand corner, the user can remove the visual guides 926 and 928 for the user controls from the screen 920.

Figure 18:
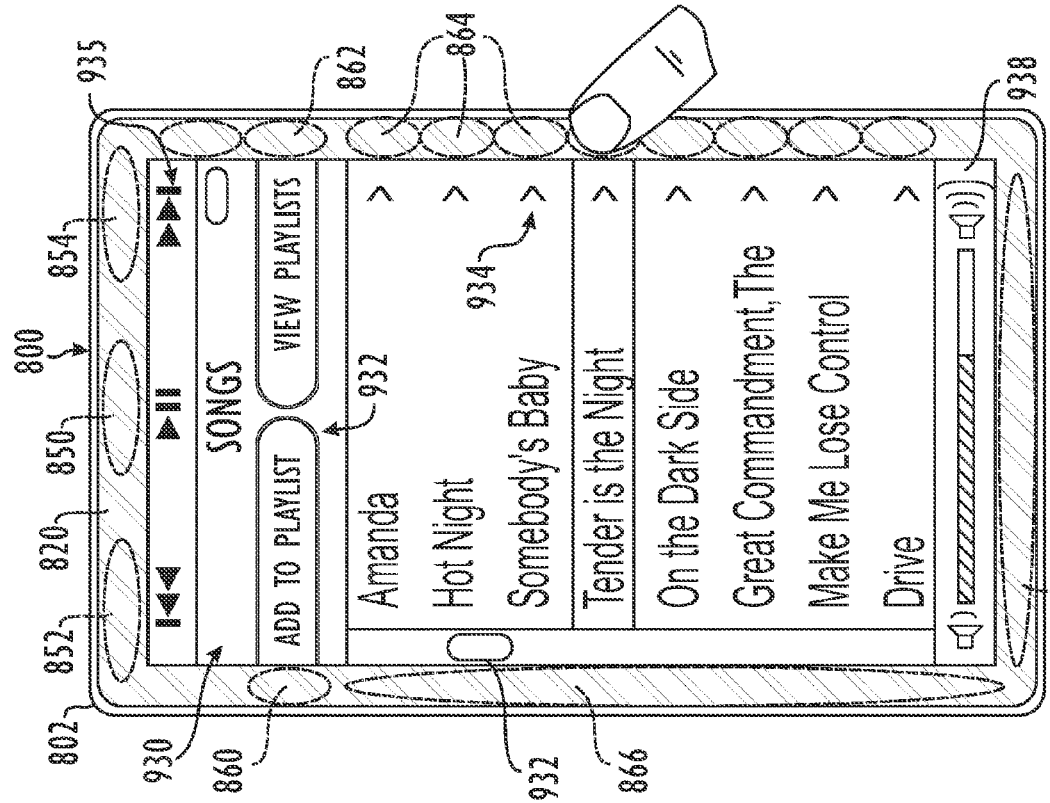

In FIG. 18, an example screen 930 listing songs is shown on the display 810 of the device 800. A plurality of areas 864 on the right side of the bezel 820 adjacent visual guides 934 for the listed songs can be used to select, highlight, or open the corresponding song. An area 864 on the left side of the bezel 820 adjacent a scroll guide 934 can be used to scroll through the list of songs on the screen 930. If the user selects or highlights one of the listed songs, the user can select areas 850 to play/pause the song or areas 852, 854 to track forward or back from the selected song. These areas 850, 852, 854 have corresponding visual guides 935. The user can also select to add the selected song to a play list or can elect to view various play lists by selecting from additional areas 860 and 862 having visual guides 932. Depending on the amount of area of the display 810 available, one or more user controls 938 (e.g., volume level) can be displayed on the screen 930, and one or more unused areas 868 of the bezel 820 can be designated for the one or more user controls 938.

Figure 19:
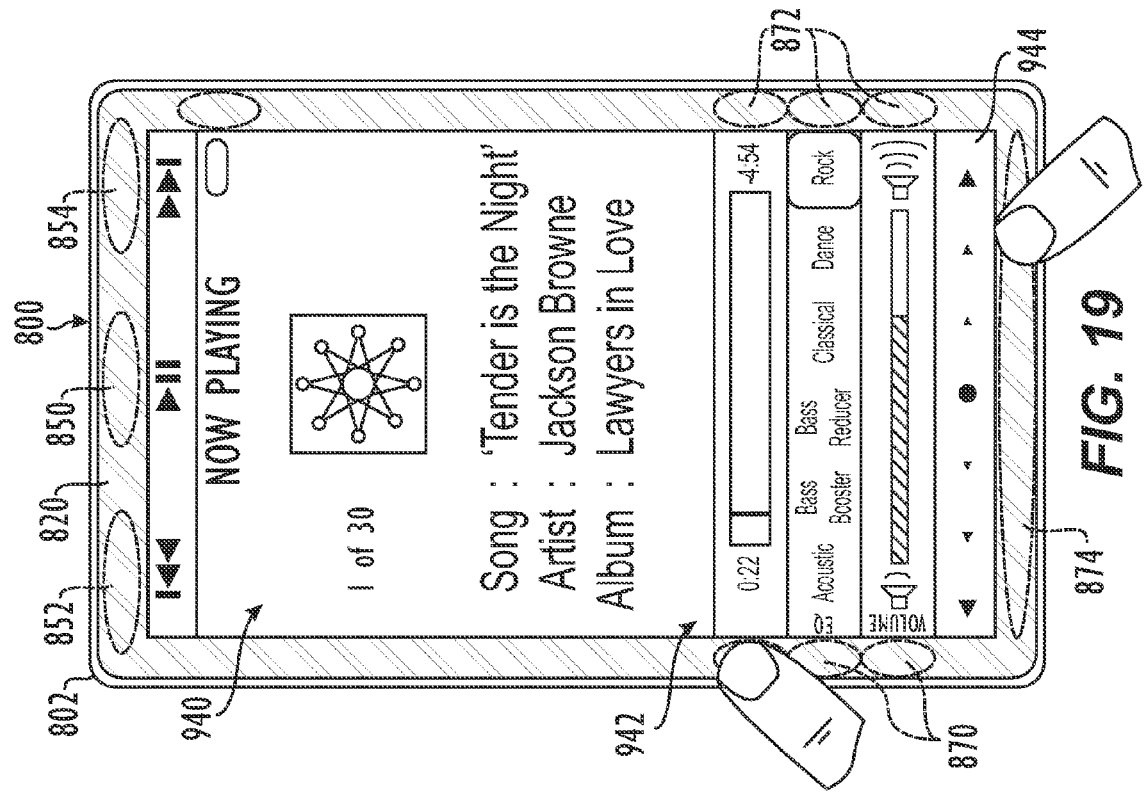

In FIG. 19, an example "now playing" screen 940 is shown on the display 810 of the device 800. The screen 940 shows information about the song that is currently being played on the device 800. As before, the area 850 on the bezel 820 is designated for play/pause user controls, and areas 852 and 854 are designated for previous track and next track, respectively. A plurality of areas 870 and 872 are provided on the sides of the bezel 820 adjacent various visual guides 942 corresponding to various user controls (e.g., time bar for song, equalizer selection, and volume level). In one possibility, the user can select to change the settings or values of any one of these user controls by tapping or holding on the areas 870 or 872 on either side of the adjacent visual guide 942 for a control to advance or reduce the setting or value. In another possibility, the user can select or highlight one of the user controls by tapping or holding on the areas 870 or 872 on either side of the adjacent visual guide 942 for a control, and the user can then advance or reduce the setting or value by sliding over an additional area 874 of the bezel 820 next to the visual guide 944 for adjustability.

As shown by the example multimedia device 800 of FIGS. 15 through 19, the touch sensitive bezel 820 and the user interface 900 according to certain teachings of the present disclosure can obtain and process various forms of touch data. For example, the touch sensitive bezel 820 can be used to sense touch gestures, such as touch and drag operations, made by the user. Using the touch gestures, a user can perform a number of user controls, such as move portions of an image that are being displayed (e.g., page up or page down), move a curser to drop and drag visual elements displayed (e.g., move a holder or file in a directory window), scroll up and down through a screen, skip through images in an album or series of images, adjust the setting or value of a user control, or perform similar operations. In addition, because the touch sensitive bezel 820 can also be configured to detect force, the pressure that a user applies to a designated area of the bezel 820 can be used to determine the amount, extent, or level of a setting, adjustment, or value of a user control.

Furthermore, the touch sensitive bezel 820 according to the present disclosure can be used to obtain touch data corresponding to multiple user controls simultaneously. For example, the user controls of the bezel 820 can be configured so that one side of the bezel 820 controls brightness with a touch and drag motion by the user, while the other side of the bezel 820 controls contrast with a touch and drag motion by the user. Thus, using both of these sides of the bezel 820, the user can simultaneously adjust both the contrast and the brightness of the display 810 using touch and drag motions on the sides of the bezel 820. These and other possibilities and combinations will be apparent to one skilled in the art having the benefit of the present disclosure.

The foregoing description of preferred and other embodiments shows several different configurations of electronic devices. Certain features, details, and configurations were disclosed in conjunction with each embodiment. However, one skilled in the art will understand (1) that such features, details, and configurations can be used with the various different embodiments, even if such features, details, and configurations were not specifically mentioned in conjunction with a particular embodiment, and (2) that this disclosure contemplates various combinations of the features, details, and configurations disclosed herein. More specifically, the foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An electronic device, comprising:
   a display positioned on the electronic device and having a perimeter;
   at least one touch sensitive surface positioned outside a display surface on the electronic device adjacent at least a portion of the perimeter of the display; and
   processing circuitry operatively connected to the display and to the at least one touch sensitive surface, the processing circuitry configured to:
   designate at least one area of variable size and position of the at least one touch sensitive surface for at least one control, the position and size of the at least one designated area is dependent on the context or content of what is on the display;
   generate at least one visual guide for the at least one control; and
   present the at least one visual guide for display at a location on the display adjacent the at least one area designated for the at least one control.

2. The electronic device of claim 1, wherein the processing circuitry is further configured to
   obtain touch data from the at least one touch sensitive surface, and determine if the obtained touch data invokes the at least one control.

3. The electronic device of claim 2, wherein the at least one touch sensitive surface comprises a force sensitive portion generating force data in response to a touch event, and wherein the processing circuitry is further configured to—
  obtain force data from the force sensitive portion; and
  govern an aspect of the at least one invoked control based on the obtained force data.

4. The electronic device of claim 1, wherein the at least one touch sensitive surface comprises a multi-touch input surface capable of generating touch data in response to a plurality of touch events occurring simultaneously at a plurality of locations of the surface.

5. The electronic device of claim 1, wherein the at least one touch sensitive surface comprises a bezel positioned around substantially the entire perimeter of the display.

6. The electronic device of claim 1, wherein the at least one touch sensitive surface comprises a plurality of portions positioned around at least a plurality of sides of the perimeter of the display.

7. The electronic device of claim 1, further comprising an orientation sensor operatively connected to the processing circuitry, wherein the processing circuitry is configured to
  determine an orientation of the electronic device from orientation data obtained from the orientation sensor; and
  designate the at least one area of the at least one touch sensitive surface based on the determined orientation.

8. The electronic device of claim 1, wherein the processing circuitry is configured to—
  determine an orientation of content for the display, the content capable of being displayed in one of at least two orientations; and
  designate the at least one area of the at least one touch sensitive surface based on the determined orientation of the content.

9. The electronic device of claim 1, wherein the electronic device comprises a housing having a face with an area, the display positioned on the face of the housing and substantially encompassing the area of the face.

10. An electronic device, comprising:
  a display positioned on the electronic device and having a perimeter;
  a touch sensitive bezel positioned outside a display surface on the electronic device around at least a portion of the perimeter of the display; and
  processing circuitry operatively connected to the touch sensitive bezel, the processing circuitry configured to:
    designate at least one area of variable size and position of the touch sensitive bezel for at least one control, the position and size of the at least one designated area is dependent on the context or content of what is on the display,
    obtain touch data from the touch sensitive bezel, and
    determine if the at least one control is invoked by the obtained touch data.

11. The electronic device of claim 10, wherein the processing circuitry is configured to initiate at least one operation for the electronic device based on the at least one determined control.

12. The electronic device of claim 10, wherein the touch sensitive bezel is positioned around substantially the entire perimeter of the display.

13. The electronic device of claim 10, wherein at least a portion of the touch sensitive bezel comprises a multi-touch input surface capable of generating touch data in response to a plurality of touch events occurring simultaneously at a plurality of locations of the surface.

14. The electronic device of claim 13, wherein the multi-touch input surface of the bezel comprises an array having a plurality of capacitive sensors arranged in rows and in columns substantially around the perimeter of the display.

15. The electronic device of claim 14, wherein to obtain touch data from the multi-touch input surface of the bezel, the processing circuitry comprises acquisition circuitry having at least two first multiplexer circuits coupled to the rows of the array and having at least two second multiplexer circuits coupled to the columns of the array, the at least two first multiplexer circuits controllably connecting the rows of the array to a reference voltage and a storage capacitor, the at least two second multiplexer circuits controllably connecting the rows of the array to a reference voltage and a storage capacitor.

16. The electronic device of claim 10, wherein the touch sensitive bezel comprises:
  a plurality of conductive pads arranged around at least a portion of the perimeter of the display;
  a plurality of resistors interconnecting the conductive pads; and
  an integrated circuit coupled to at least three approximately equidistant points of interconnected pads, the integrated circuit sensing measurements at the at least three points and determining a position of a touch event occurring on the bezel.

17. The electronic device of claim 16, wherein the plurality of pads comprise a plurality of conductive films on a surface of a circuit board surrounding the display.

18. The electronic device of claim 17, wherein the plurality of pads comprise a plurality of conductive films deposited on a surface of the display adjacent the perimeter.

19. The electronic device of claim 10, wherein to determine if the at least one control is invoked by the obtained touch data, the processing circuitry is configured to
  designate at least one area of the touch sensitive bezel for the at least one control;
  compare the obtained touch data to the at least one designated area of the touch sensitive bezel; and
  determine the at least control invoked by the obtained touch data based on the comparison.

20. The electronic device of claim 19, wherein the processing circuitry is operatively connected to the display and is configured to—
  generate at least one visual guide for the at least one control; and
  present the at least one visual guide for display at a location on the display adjacent the at least one area designated for the at least one control.

21. The electronic device of claim 19, further comprising an orientation sensor operatively connected to the processing circuitry, wherein the processing circuitry is configured to
  determine an orientation of the electronic device from orientation data obtained from the orientation sensor; and
  designate the at least one area of the touch sensitive bezel for the at least one control based on the determined orientation.

22. The electronic device of claim 19, wherein the processing circuitry is configured to
  present content for the display in one of at least two orientations; and
  designate the at least one area of the at least one touch sensitive bezel based on the orientation of the content.

23. The electronic device of claim 10, wherein the electronic device comprises a housing having a face with an area, the display positioned on the face of the housing and substantially encompassing the area of the face.

24. The electronic device of claim 10, wherein the touch sensitive bezel comprises a force sensitive portion generating force data in response to a touch event, and wherein the processing circuitry is further configured to
   obtain force data from the force sensitive portion of the touch sensitive bezel; and
   govern an aspect of the at least one invoked control based on the obtained force data.

25. An electronic device, comprising:
   a display positioned on the electronic device and having a perimeter;
   a multi-touch input bezel positioned outside a display surface on the electronic device substantially around the perimeter of the display; and
   processing circuitry operatively connected to the display and the multi-touch input bezel, the processing circuitry designating one or more areas of variable size and position on the multi-touch input bezel for one or more controls used to operate the electronic device, the position and size of the one or more areas is dependent on the context or content of what is on the display, the processing circuitry generating one or more visual guides corresponding to the one or more controls and sending visual data to the display for displaying the one or more visual guides on the display adjacent the one or more areas on the multi-touch input bezel designated for the one or more controls, the processing circuitry obtaining touch data from the multi-touch input bezel and determining if at least one of the one or more controls that corresponds to the designated areas is invoked by the obtained touch data.

26. The electronic device of claim 25, wherein the multi-touch input bezel is positioned around the entire perimeter of the display.

27. The electronic device of claim 25, wherein the multi-touch input bezel comprises an array having a plurality of capacitive sensors arranged in rows and in columns substantially around the perimeter of the display.

28. The electronic device of claim 27, wherein to obtain the touch data for the multi-touch input bezel, the processing circuitry comprises acquisition circuitry having at least two first multiplexer circuits coupled to the rows of the array and having at least two second multiplexer circuits coupled to the columns of the array, the at least two first multiplexer circuits controllably connecting the rows of the array to a reference voltage and a storage capacitor, the at least two second multiplexer circuits controllably connecting the rows of the array to a reference voltage and a storage capacitor.

29. The electronic device of claim 25, wherein to determine if at least one of the one or more controls that corresponds to the designated areas is invoked by the obtained touch data, the processing circuitry compares the obtained touch data to the one or more areas of the multi-touch input bezel designated for the one or more controls and determines the at least control invoked by the obtained touch data based on the comparison.

30. The electronic device of claim 25, further comprising an orientation sensor operatively connected to the processing circuitry, wherein the processing circuitry determines an orientation of the electronic device from orientation data obtained from the orientation sensor, and wherein the processing circuitry designates the one or more areas of the multi-touch input bezel for the one or more controls based on the determined orientation.

31. The electronic device of claim 25, wherein the processing circuitry presents content for the display in one of at least two orientations and designates the at least one area on the at least one touch sensitive bezel based on the orientation of the content.

32. The electronic device of claim 25, wherein the electronic device comprises a housing having a face with an area, the display positioned in the face of the housing and substantially encompassing the area of the face.

33. The electronic device of claim 25, wherein the multi-touch input bezel comprises a force sensitive portion generating force data in response to a touch event, and wherein the processing circuitry obtains force data from the force sensitive portion and governs an aspect of the at least one invoked control based on the obtained force data.

34. An electronic device, comprising:
   a display positioned on the electronic device and having a perimeter;
   means positioned outside a display surface on the electronic device for obtaining touch data from adjacent the perimeter of the display;
   means for designating one or more areas of variable size and position adjacent the perimeter of the display for one or more controls, the position and size of the one more designated areas is dependent on the context or content of what is on the display;
   means for generating one or more visual guides for the one or more controls;
   means for presenting the one or more visual guides for display at one or more locations on the display adjacent the one or more designated areas;
   means for determining if at least one of the one or more controls is invoked by obtained touch data; and
   means for operating the electronic device with the at least one invoked control.

35. The electronic device of claim 34, further comprising:
   means for determining an orientation of the electronic device; and
   means for designating the one or more areas based on the determined orientation of the electronic device.

36. The electronic device of claim 34, further comprising:
   means for presenting content on the display in one of at least two orientations; and
   means for designating the one or more areas based on the orientation of the content.

37. The electronic device of claim 34, wherein the means for determining if at least one of the one or more controls is invoked by the obtained touch data comprises means for recognizing touch gestures based on the obtained touch data.

38. The electronic device of claim 34, further comprising:
   means for obtaining force data in response to a touch event, and
   means for governing an aspect of the at least one invoked control based on the obtained force data.

39. A user interface method for operating an electronic device having a display and a touch sensitive bezel outside a display surface substantially surrounding the display, the method comprising:
   presenting content on the display;
   designating one or more areas of variable size and position of the touch sensitive bezel for one or more controls of the electronic device, the position and size of the at least one designated area is dependent on the context or content of what is on the display;
   presenting one or more visual guides at a perimeter of the display adjacent to the one or more designated areas;
   detecting touch data on the touch sensitive bezel;

determining which of the controls is invoked by the touch data; and operating the electronic device with the invoked control.

40. The method of claim 39, wherein the act of presenting one or more visual guides at a perimeter of the display adjacent to the one or more designated areas comprises superimposing the visual guides over the content presented on the display.

41. The method of claim 39, wherein the act of presenting one or more visual guides at a perimeter of the display adjacent to the one or more designated areas comprises presenting the visual guides at the perimeter after being implicated by a user action selected from the group consisting of touching a predetermined portion of the touch sensitive bezel, making a predetermined touch gesture on the touch sensitive bezel, and moving the electronic device.

42. The method of claim 39, wherein the act of designating one or more areas of the touch sensitive bezel for one or more controls of the electronic device comprises:

associating one or more areas of the touch sensitive bezel with the one or more controls; and associating one or more touch gestures on the one or more associated control areas with the one or more controls.

43. The method of claim 42, wherein the act of determining which of the controls is invoked by the touch data comprises:

determining if the touch data includes the one or more associated control areas; and determining from the touch data if the one or more touch gestures associated with the one or more controls have occurred on the one or more associated control areas.

44. The method of claim 39, further comprising:

determining an orientation of the electronic device; and designating the one or more areas of the touch sensitive bezel for the one or more controls based on the determined orientation.

45. The method of claim 39, wherein the act of presenting content on the display comprises presenting content in one of at least two orientations on the display, and wherein the method further comprises designating the one or more areas on the touch sensitive bezel based on the orientation of the content.

* * * * *

UNITED STATES PATENT AND TRADEMARK OFFICE
CERTIFICATE OF CORRECTION

PATENT NO. : 7,656,393 B2  Page 1 of 1
APPLICATION NO. : 11/426078
DATED : February 2, 2010
INVENTOR(S) : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,656,393 B2 | Page 1 of 1 |
| APPLICATION NO. | : 11/426078 | |
| DATED | : February 2, 2010 | |
| INVENTOR(S) | : Nick King et al. | |

It is certified that error appears in the above-identified patent and that said Letters Patent is hereby corrected as shown below:

Title page 4, Item (56) under "Other Publications", in column 1, line 67, delete "finger.works.com" and insert -- www.fingerworks.com --, therefor.

Signed and Sealed this
Twenty-ninth Day of November, 2011

David J. Kappos
*Director of the United States Patent and Trademark Office*